US011186134B2

(12) United States Patent
Ohno et al.

(10) Patent No.: US 11,186,134 B2
(45) Date of Patent: Nov. 30, 2021

(54) ELECTRICALLY POWERED SUSPENSION SYSTEM

(71) Applicant: HONDA MOTOR CO., LTD., Tokyo (JP)

(72) Inventors: Satoshi Ohno, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/845,219

(22) Filed: Apr. 10, 2020

(65) Prior Publication Data

US 2020/0324603 A1 Oct. 15, 2020

(30) Foreign Application Priority Data

Apr. 12, 2019 (JP) ............................ JP2019-076546

(51) Int. Cl.
*B60G 17/015* (2006.01)
*B60G 17/018* (2006.01)
(Continued)

(52) U.S. Cl.
CPC ....... *B60G 17/0152* (2013.01); *B60G 17/016* (2013.01); *B60G 17/018* (2013.01); *B60G 17/06* (2013.01)

(58) Field of Classification Search
CPC ............ B60G 17/0152; B60G 17/0157; B60G 17/018; B60G 17/016; B60G 17/06;
(Continued)

(56) References Cited

U.S. PATENT DOCUMENTS 3,846,579 A 11/1974 Takanashi et al.
5,598,337 A * 1/1997 Butsuen ................ B60G 13/16 701/37
(Continued)

FOREIGN PATENT DOCUMENTS

JP S49-22837 A 2/1974
JP 2012-111360 A 6/2012
(Continued)

OTHER PUBLICATIONS

Office Action received in corresponding Japanese application No. 2019-076546 dated Nov. 10, 2020 with English translation (8 pages).

*Primary Examiner* — Paul N Dickson
*Assistant Examiner* — Daniel M. Keck
(74) *Attorney, Agent, or Firm* — Rankin, Hill & Clark LLP

(57) ABSTRACT

An electrically powered suspension system includes: an electromagnetic actuator generating a driving force for vibration damping of the vehicle; an information acquisition part acquiring information on a stroke velocity of the electromagnetic actuator; a damping force calculator calculating a target damping force of the electromagnetic actuator, based on the information on the stroke velocity acquired by the information acquisition part; and a drive controller based on the target damping force calculated. The damping force calculator performs frequency-shaping of the stroke velocity for suppressing a low-frequency component of the stroke velocity, calculates an adjusted damping force based on the information on the stroke velocity after the frequency-shaping, and adjusts the target damping force using the adjusted damping force calculated. The suspension system appropriately suppresses vibration near a system resonance point while keeping excellent ride quality of the vehicle.

14 Claims, 18 Drawing Sheets

(51) Int. Cl.
*B60G 17/016* (2006.01)
*B60G 17/06* (2006.01)

(58) Field of Classification Search
CPC ............ B60G 2202/42; B60G 2600/60; B60G 2600/602; B60G 2600/604; B60G 2400/102; B60G 2400/0523; B60G 2400/204; B60G 2500/10
See application file for complete search history.

(56) References Cited

U.S. PATENT DOCUMENTS

| | | | | |
|---|---|---|---|---|
| 5,810,384 | A * | 9/1998 | Iwasaki | B60G 17/0165<br>280/5.515 |
| 9,963,006 | B2 * | 5/2018 | Kubota | B60G 17/0165 |
| 2007/0198149 | A1 * | 8/2007 | Nishioka | B60G 17/018<br>701/36 |
| 2011/0218707 | A1 * | 9/2011 | Inoue | B60G 17/06<br>701/37 |
| 2017/0267051 | A1 | 9/2017 | Toyohira et al. | |
| 2018/0297433 | A1 | 10/2018 | Ohno et al. | |
| 2018/0297434 | A1 | 10/2018 | Ohno et al. | |
| 2018/0361813 | A1 | 12/2018 | Ohno et al. | |
| 2020/0114721 | A1 * | 4/2020 | Tanzan | B60G 17/0162 |
| 2021/0016620 | A1 * | 1/2021 | Gokhale | B60G 13/04 |
| 2021/0031585 | A1 * | 2/2021 | Toyohira | B60G 17/06 |

FOREIGN PATENT DOCUMENTS

| | | | |
|---|---|---|---|
| JP | 2017-165243 | A | 9/2017 |
| JP | 2018-177049 | A | 11/2018 |
| JP | 6417443 | B1 | 11/2018 |
| JP | 2019-001368 | A | 1/2019 |

* cited by examiner

ELECTRICALLY POWERED SUSPENSION SYSTEM

CROSS REFERENCE TO RELATED APPLICATIONS

This application claims the benefit of foreign priority to Japanese Patent Application No. 2019-076546, filed on Apr. 12, 2019, which is incorporated by reference in its entirety.

TECHNICAL FIELD

The present invention relates to an electrically powered suspension system including an electromagnetic actuator. The electromagnetic actuator is disposed between a vehicle body and a wheel and includes an electric motor that generates a driving force used for vibration damping and extension/contraction.

BACKGROUND ART

The applicant of the present application has proposed an electrically powered suspension system including an electromagnetic actuator that is installed between a vehicle body and a wheel and includes an electric motor generating a driving force used for vibration damping and extension/contraction (for example, see PTL 1). The electromagnetic actuator includes a ball screw mechanism in addition to the electric motor. The electromagnetic actuator operates to generate a driving force for the vibration damping and extension/contraction by converting rotary motion of the electric motor into linear motion of the ball screw mechanism.

In this respect, the driving force for the damping operation means a damping force. The damping force is a force (reaction force) in a direction opposite to a direction of a stroke velocity of the electromagnetic actuator.

The electrically powered suspension system of Japanese Patent NO. 6417443 (hereinbelow, referred to as "Patent Document 1") is strongly required to avoid a situation leading to a full bump condition or a full rebound condition in order to satisfy the ride quality and driving stability of the vehicle at the same time before happening.

For the purpose of meeting the above requirement, the electrically powered suspension system of Patent Document 1 includes: an electromagnetic actuator that is provided between a vehicle body and a vehicle wheel and generates a driving force for a damping operation; an information acquisition part that acquires a stroke position of the electromagnetic actuator; and an electronic control unit (hereinafter referred to as an "ECU") that sets a target damping force of the electromagnetic actuator and controls drive of the electromagnetic actuator using a target driving force based on the thus-set target damping force.

In a case where the stroke position is in an end area near a stroke end, the ECU adjusts the target driving force in order to advance the stroke position toward a neutral area from the end area.

The electrically powered suspension system of Patent Document 1 is capable of avoiding the situation leading to a full bump condition or a full rebound condition before happening in a vehicle's hard driving scene.

SUMMARY OF THE INVENTION

Technical Problem

The electrically powered suspension system of Patent Document 1, however, refers to no special consideration to how to appropriately suppress vibration near a system resonance point (where a resonance frequency is approximately 40 to 100 Hz), which derives from: inertial moment (inertia) caused by drive of the electromagnetic actuator included in the system; and rigidity of the electromagnetic actuator.

Thus, the electrically powered suspension system of Patent Document 1 needs improvement to the following points. If an amount of control on the damping force is increased in order to obtain an effect of suppressing the vibration near the system resonance point, damping characteristic shifts to hard damping, and the ride quality is impaired. On the other hand, if the amount of control on the damping force is decreased in order to enhance the ride quality of the vehicle, the vibration near the system resonance point cannot be sufficiently suppressed, and noise deriving from the resonance vibration disturbs the quietness of the vehicle compartment.

Solution to Problem

The present invention has been made with the above fact taken into consideration. An object of the present invention is to provide an electrically powered suspension system that is capable of appropriately suppressing the vibration near the system resonance point while keeping the ride quality of the vehicle excellent.

For the purpose of achieving the above object, a first aspect of the present invention has the following main feature. The first aspect of the present invention includes: an electromagnetic actuator provided between a vehicle body and a wheel of a vehicle and generating a driving force for vibration damping of the vehicle; an information acquisition part that acquires information on a stroke velocity of the electromagnetic actuator; a damping force calculator that calculates a target damping force, serving as a target value of an damping operation of the electromagnetic actuator, based on the information on the stroke velocity acquired by the information acquisition part; and a drive-controller that controls drive of the electromagnetic actuator using a target driving force based on the target damping force calculated by the damping force calculator. The damping force calculator performs frequency-shaping for suppressing a low-frequency component of the stroke velocity; calculates an adjusted damping force based on the information on the stroke velocity after the frequency-shaping; and adjusts the target damping force using the calculated adjusted damping force.

The present invention can appropriately suppress the vibration near the system resonance point while keeping the ride quality of the vehicle excellent.

BRIEF DESCRIPTION OF DRAWINGS

The drawings described herein are for illustration purposes only and are not intended to limit the scope of the present disclosure in any way.

DESCRIPTION OF EMBODIMENTS

Figure 1:
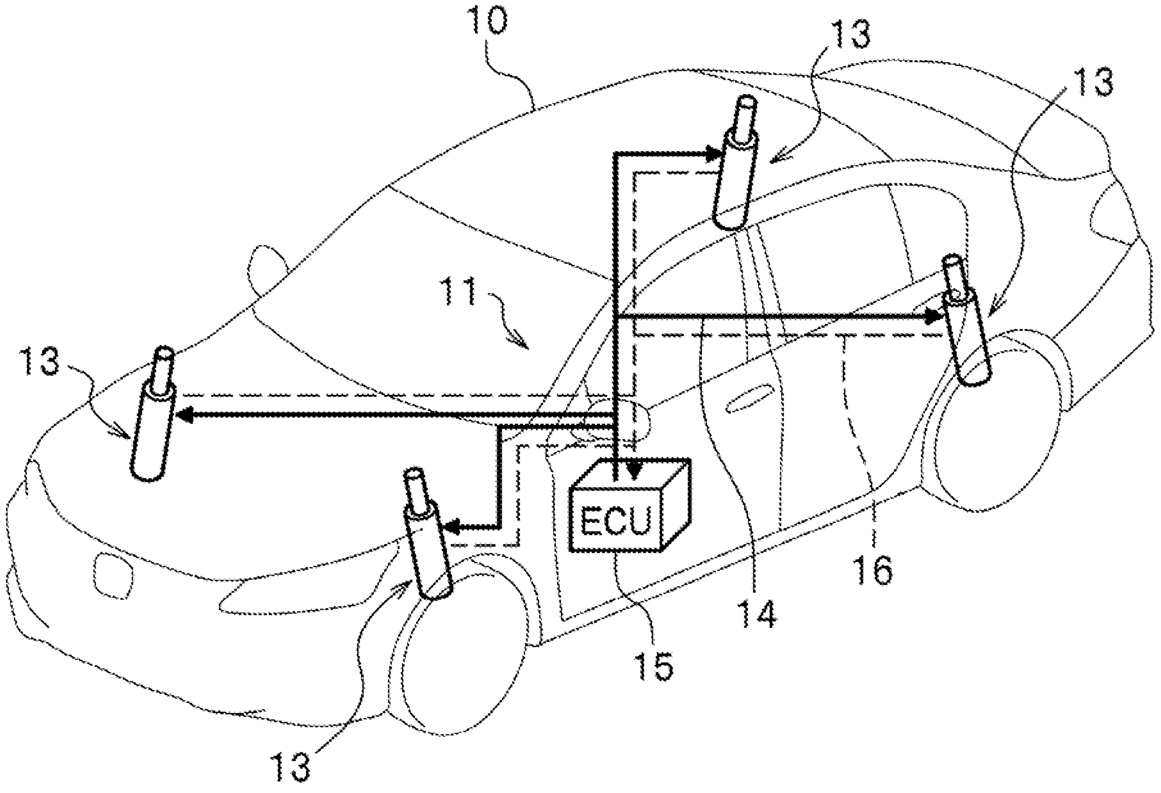
FIG. 1 is an overall configuration diagram of an electrically powered suspension system according to an embodiment of the present invention.

Hereinbelow, description is given of an electrically powered suspension system according to an embodiment of the present invention in detail with reference to the drawings as appropriate.

In the drawings described below, members having functions common thereto are denoted by common reference numerals. Further, a size and shape of the member may be schematically represented by deformation or exaggeration for convenience of explanation.

<Basic Configuration Common to All Embodiments of the Present Invention>

Figure 2:
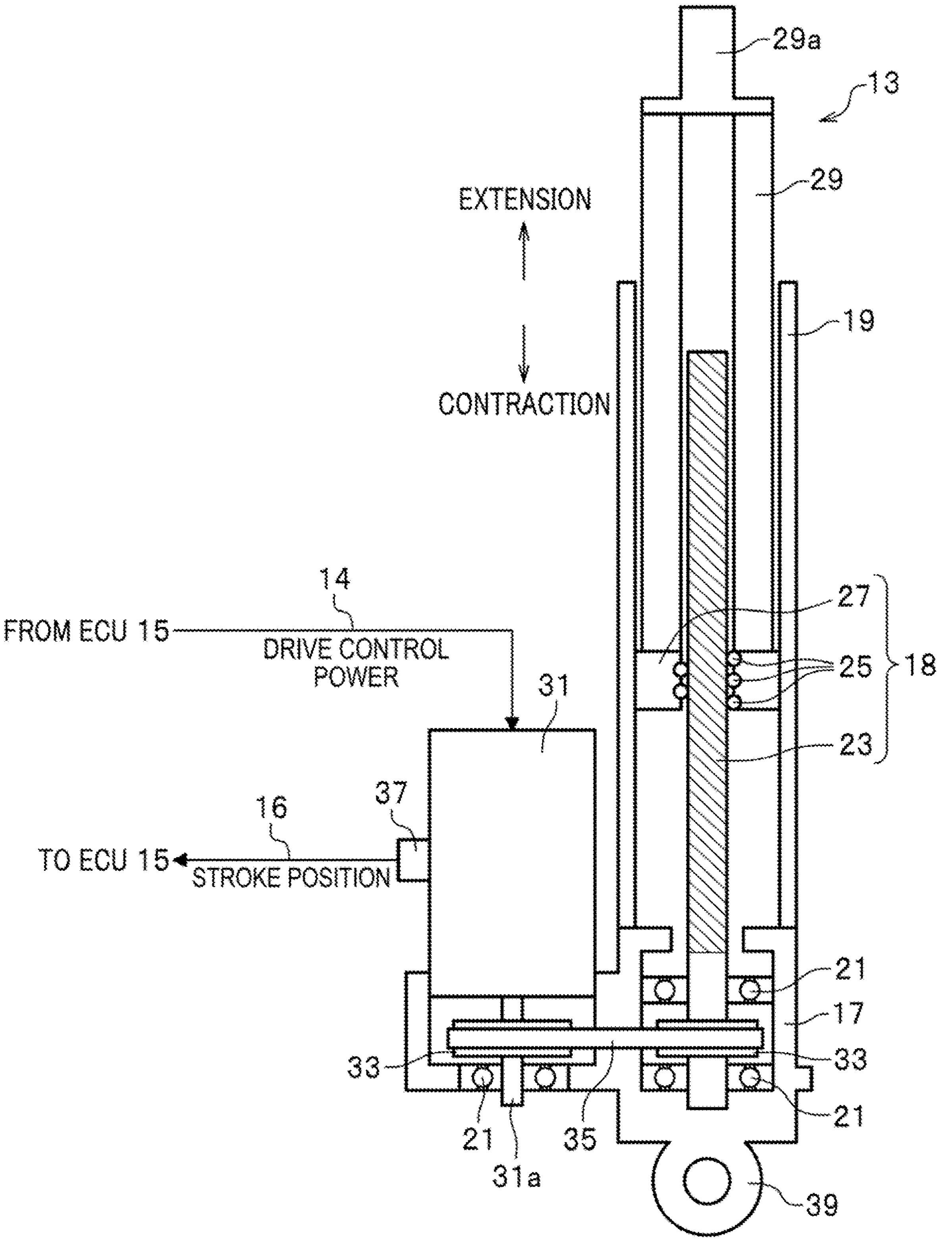
FIG. 2 is a partial sectional view of an electromagnetic actuator provided in the electrically powered suspension system.

First, description is given of a basic configuration common to all the electrically powered suspension systems 11 according to embodiments of the present invention with reference to FIGS. 1 and 2.

FIG. 1 is a diagram showing the overall configuration of an electrically powered suspension system 11 according to one embodiment of the present invention.

FIG. 2 is a partially sectional view of an electromagnetic actuator 13 partially constituting the electrically powered suspension system 11.

As shown in FIG. 1, the electrically powered suspension system 11 according to the embodiment of the present invention includes a plurality of electromagnetic actuators 13 provided for respective wheels 10 and one electronic control device (hereinbelow, referred to as "ECU") 15. The ECU 15 is connected with each of the plurality of the electromagnetic actuators 13 through a power supply line 14 (see a solid line in FIG. 1) supplying drive control power from the ECU 15 to each electromagnetic actuators 13 and a signal line 16 (see a broken line in FIG. 1) transmitting a rotation angle signal of the electric motor 31 from the plurality of the electromagnetic actuators 13 to (see FIG. 2) to the ECU 15.

In the present embodiment, four of the electromagnetic actuators 13 are provided respectively to the wheels including front wheels (front right wheel, front left wheel) and rear wheels (rear right wheel, rear left wheel). The electromagnetic actuators 13 provided for each wheel are driven and controlled separately from each other in each synchronization with the extension/contraction for each wheel.

In the embodiment of the present invention, unless otherwise stated, each of the plurality of electromagnetic actuators 13 has a configuration common to each other. Therefore, all the plurality of electromagnetic actuators 13 are described by explaining a configuration of one electromagnetic actuator 13.

As shown in FIG. 2, the electromagnetic actuator 13 includes a base housing 17, an outer tube 19, ball bearings 21, a ball screw shaft 23, a plurality of balls 25, a nut 27, and an inner tube 29.

The base housing 17 rotatably supports a base end portion of the ball screw shaft 23 around its axis with interposition of the ball bearing 21. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 with interposition of the plurality of balls 25, and converts rotational motion of the ball screw shaft 23 into linear motion. The inner tube 29 connected to the nut 27 is integrated with the nut 27 and movable in an axial direction of the outer tube 19.

As seen in FIG. 2, the electromagnetic actuator 13 includes the electric motor 31, a pair of pulleys 33, and a belt member 35 in order to transmit a rotational driving force to the ball screw shaft 23. The electric motor 31 is provided on the base housing 17 so as to be arranged in parallel with the outer tube 19. The pulleys 33 are respectively attached to a motor shaft 31*a* of the electric motor 31 and the ball screw shaft 23. The belt member 35 such as a toothed belt (cogged belt) for transmitting the rotational driving force of the electric motor 31 to the ball screw shaft 23 is put round the pair of pulleys 33.

The electric motor 31 is provided with a resolver 37 for detecting a rotation angle of the electric motor 31. The rotation angle of the electric motor 31 detected by the resolver 37 is sent to the ECU 15 via the signal line 16. The electric motor 31 is controlled in its rotational driving force by the ECU 15 in accordance with the drive control power to be supplied to each of the plurality of electromagnetic actuators 13 via the power supply line 14.

According to this embodiment, as seen in FIG. 2, a dimension in the axial direction of the electromagnetic actuator 13 is shortened by employing a layout in which the motor shaft 31*a* of the electric motor 31 and the ball screw shaft 23 are arranged substantially in parallel and connected with each other. However, another layout may be employed in which, for example, the motor shaft 31*a* of the electric motor 31 and the ball screw shaft 23 are coaxially arranged and connected to each other.

As seen in FIG. 2, the electromagnetic actuator 13 according to this embodiment has a connecting portion 39 provided at a lower end of the base housing 17. The connecting portion 39 is connected and fixed to an unsprung member (not shown) such as a lower arm and a knuckle provided on the wheel. On the other hand, an upper end portion 29*a* of the inner tube 29 is connected and fixed to a sprung member (not shown) such as a strut tower portion provided on the vehicle body. In other words, the electromagnetic actuator 13 is arranged in parallel with a spring member (not shown) provided between the body and the wheel of the vehicle 10. The sprung member is provided with a sprung acceleration sensor 40 (see FIG. 3) detecting the acceleration of the vehicle body (sprung) along the stroke direction of the electromagnetic actuator 13.

The electromagnetic actuator 13 configured as described above operates as follows. For example, it is assumed that momentum relating to upward vibration is inputted to the connecting portion 39 from a wheel of the vehicle 10. In this case, the inner tube 29 and the nut 27 are about to together descend with respect to the outer tube 19 to which the momentum relating to the upward vibration is applied. In response to the above momentum, the ball screw shaft 23 is about to rotate in a direction following the descending of the nut 27. At this time, the rotational driving force of the electric motor 31 is generated in a direction preventing the nut 27 from descending. The rotational driving force of the electric motor 31 is transmitted to the ball screw shaft 23 via the belt member 35.

In this way, the vibration transmitted from the wheel to the vehicle body is damped by applying a reaction force (damping force) that is against the momentum relating to the upward vibration to the ball screw shaft 23.

<Configuration of Internal and Peripheral Parts of ECU 15>

Next, internal configuration and peripheral configurations of the ECU 15 equipped in the electrically powered suspension system 11 is described with reference to FIGS. 3 and 4A to 4C.

Figure 3:
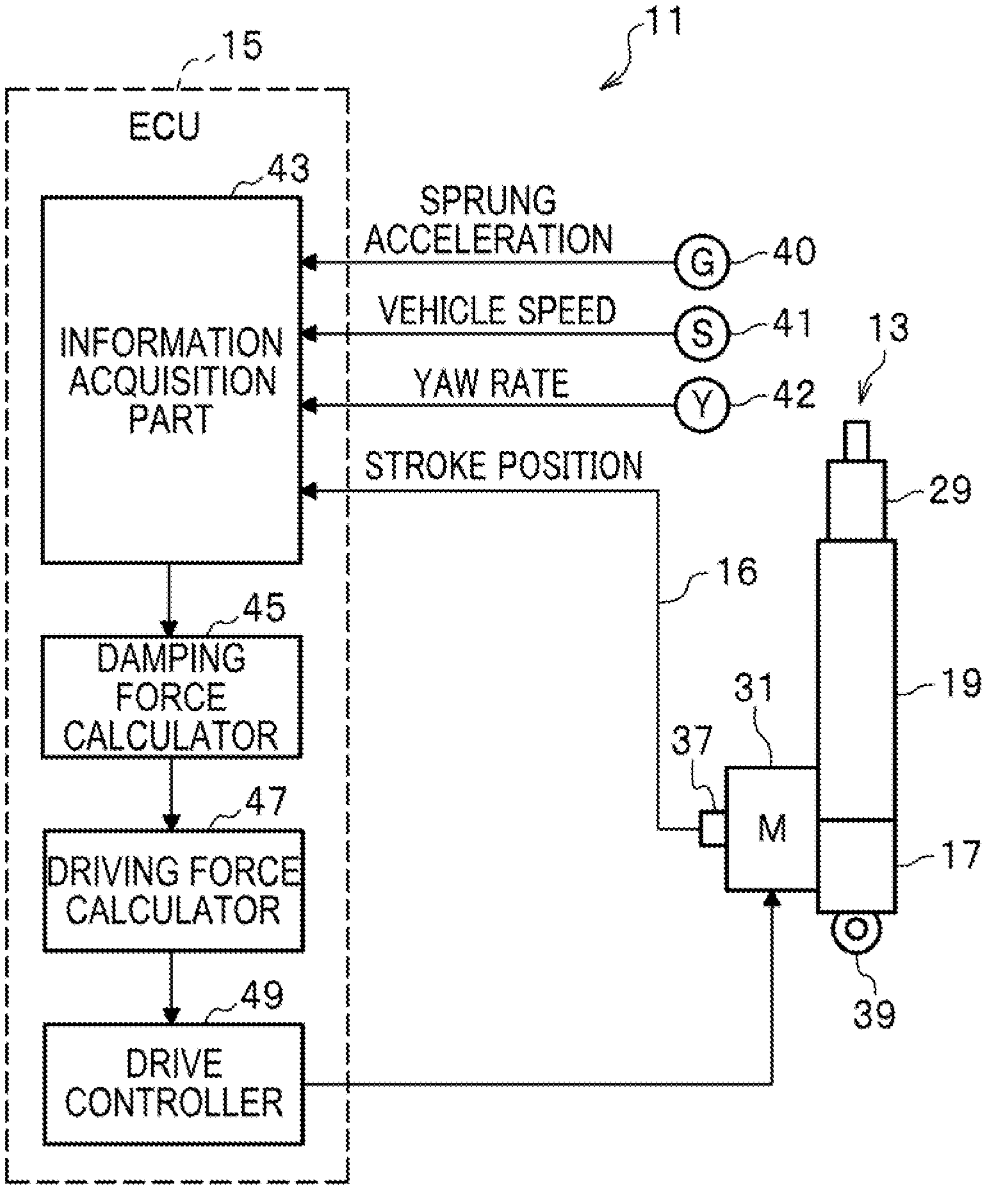
FIG. 3 is a block diagram of internal and peripheral portions of an ECU (Electronic Control Unit) included in the electrically powered suspension system.
Figure 4A:
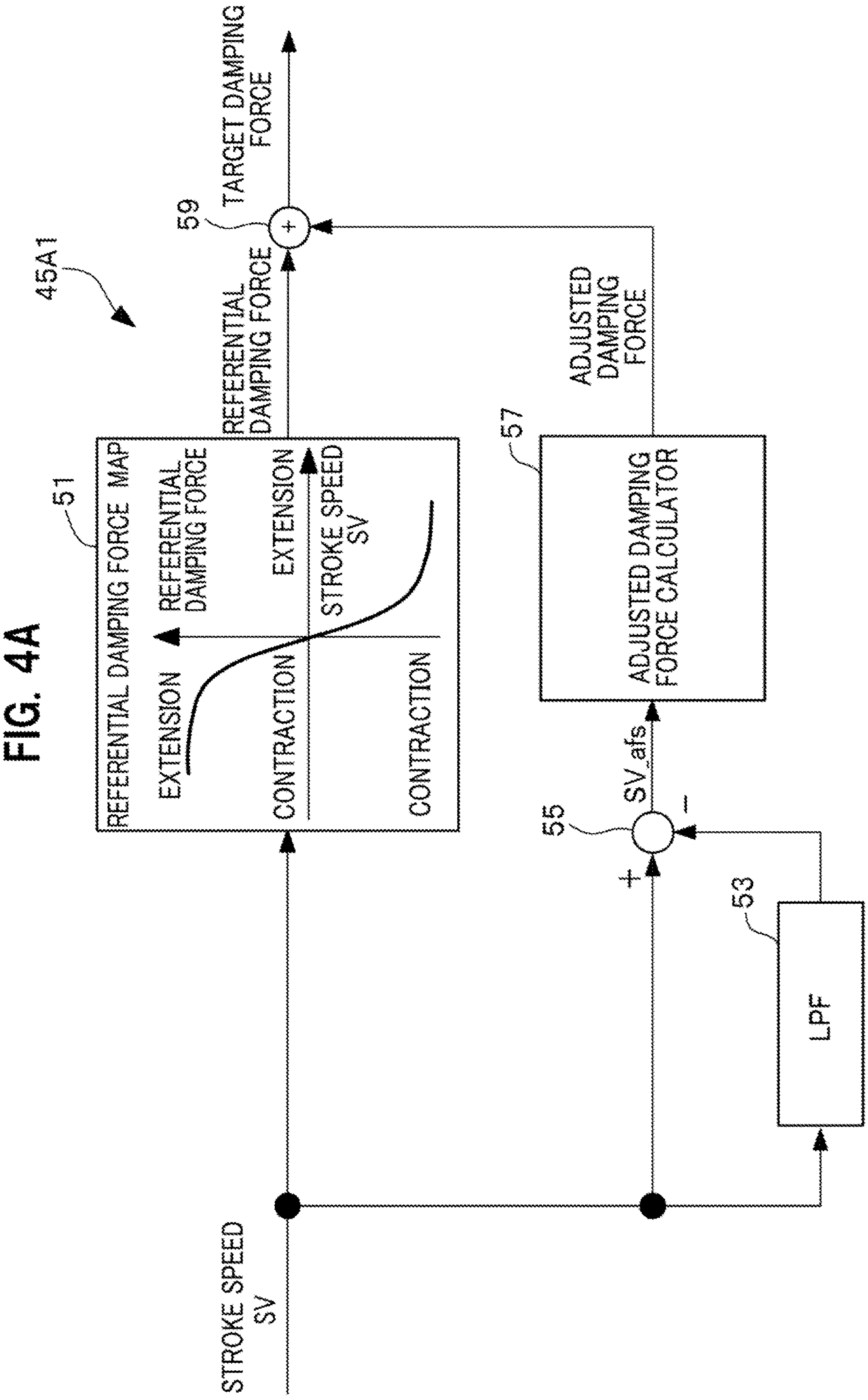
FIG. 4A is a diagram conceptually showing an internal configuration of a first embodiment of a damping force calculator included in the ECU.
Figure 4B:
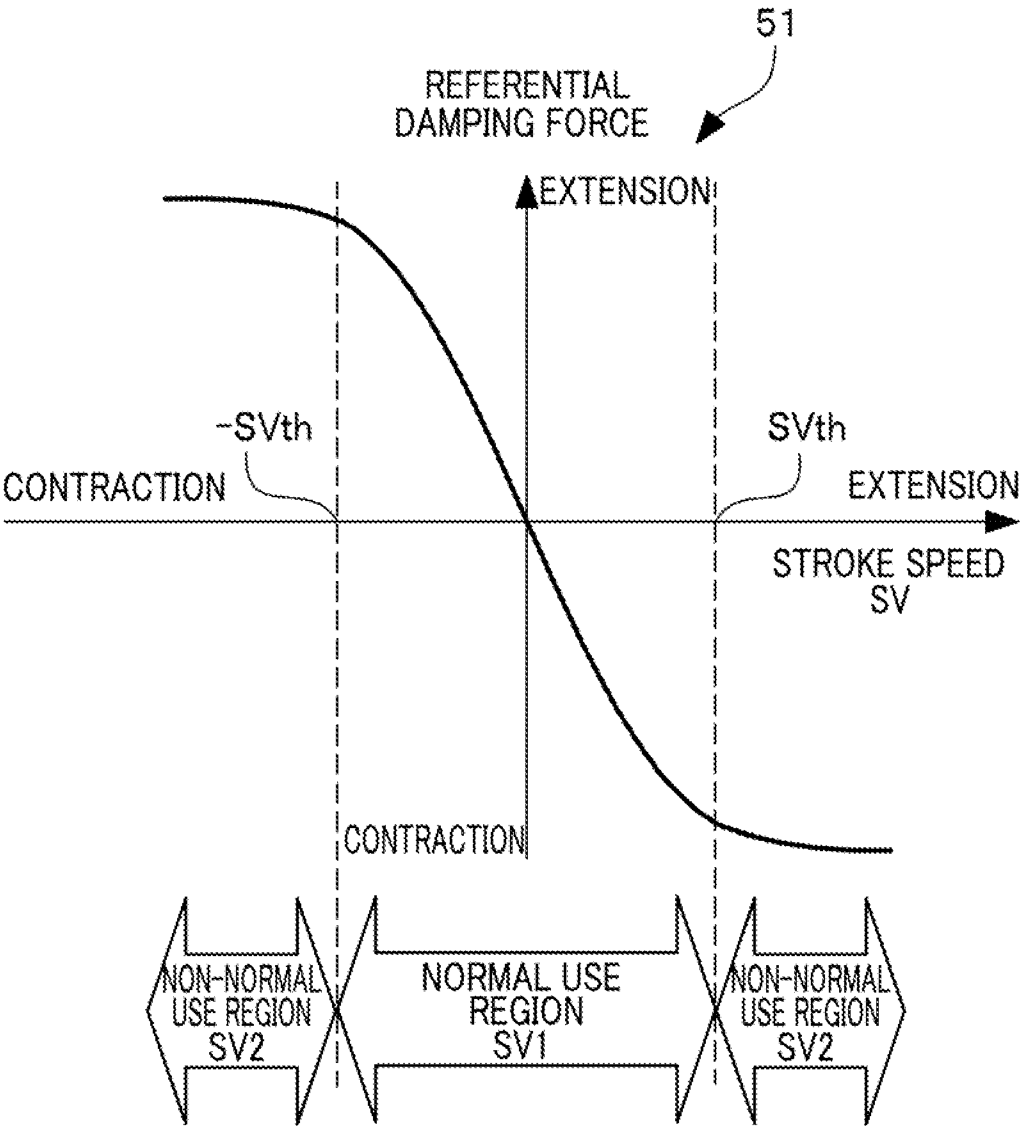
FIG. 4B is an explanatory diagram conceptually illustrating a referential damping force map used to calculate a referential damping force that varies in response to a stroke speed.
Figure 4C:
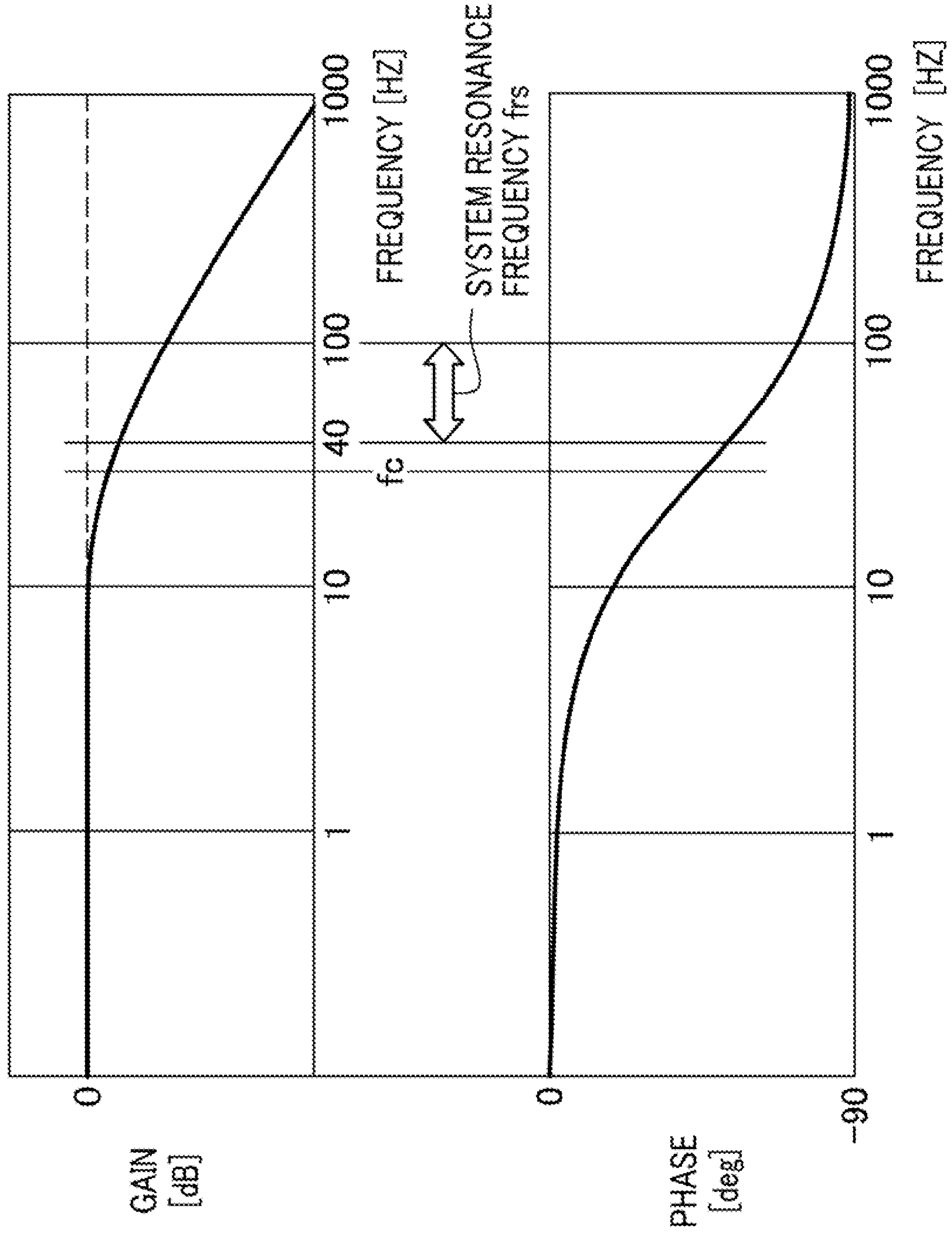
FIG. 4C is an explanatory diagram illustrating a frequency characteristics of a gain and a phase of a low-pass filter included in a damping force calculator according to the first embodiment.

FIG. 3 is a diagram showing the internal configuration and peripheral configurations of the ECU 15 equipped in the electrically powered suspension system 11. FIG. 4A is a diagram conceptually illustrating an internal configuration of a driving force calculator 47A according to the embodiment provided in the ECU 15 of the electrically powered suspension system 11. FIG. 4B is an explanatory diagram conceptually showing a damping force map describing a relationship between a stroke speed SV and a target damping force that changes accompanying with a change in the stroke speed SV. FIG. 4C is an explanatory diagram illustrating a gain-frequency characteristic and phase-frequency characteristic of a low-pass filter 53 included in the damping force calculator 45A1 according to the first embodiment.

The ECU 15 includes a microcomputer configured to perform various arithmetic processing. The ECU 15 has a drive control function of generating a driving force relating to vibration damping of the vehicle by controlling driving of each of the plurality of electromagnetic actuators 13, for example, based on a rotation angle of the electric motor 31 detected by the resolver 37.

In order to achieve such a driving-control function, as seen in FIG. 3, the ECU 15 includes an information acquisition part 43, a damping force calculator 45, a driving force calculator 47, and a drive controller 49.

As shown in FIG. 3, the information acquisition part 43 acquires the rotation angle signal of the electric motor 31 detected by the resolver 37 as time-series information relating to a stroke position, and acquires information on a stroke velocity SV by time-differentiating the time-series information of the stroke position.

Further, as shown in FIG. 3, the information acquisition part 43 acquires time-series information on sprung acceleration detected by a sprung acceleration sensor 40; and information on a sprung speed by time-integrating the time-series information on the sprung acceleration. Further, as shown in FIG. 3, the information acquisition part 43 acquires vehicle speed information detected by a vehicle speed sensor 41, yaw rate information detected by a yaw rate sensor 42.

The information on the stroke velocity SV, the information on the sprung velocity, the information on the vehicle speed, and the information on the yaw rate, which are acquired by the information acquisition part 43, are all sent to the damping force calculator 45.

The damping force calculator 45 basically has a function of calculating a referential damping force, considered as a candidate for a target damping force serving as a target value of the damping operation of the electromagnetic actuator 13, by referring to the referential damping force map 51 representing information related to the referential damping force which changes in response to the information on the stroke velocity SV acquired by the information acquisition part 43. Incidentally, values of the referential damping force are actually stored as values of a referential damping force control current.

The damping force calculator 45 further has a function of calculating an adjusted damping force for appropriately adjusting the target damping force for the purpose of: sufficiently securing a damping force of a high-frequency component of the stroke velocity SV; and at the same time suppressing a damping force of a low-frequency component of the stroke velocity SV that impairs the ride quality of the vehicle 10, to a low level.

Modes of the embodiment of the damping force calculator 45 included in the ECU 15 include: a damping force calculator 45A1 (see FIG. 4A) according to the first embodiment that uses the low-pass filter 53; and a damping force calculator 45B1 (see FIG. 4D) according to the second embodiment that uses a high-pass filter 56. Incidentally, the "damping force calculator 45 is a generic term for the damping force calculators 45A1, 45B1 according to the first and second embodiments.

<Internal Configuration of Damping Force Calculator 45A1 of First Embodiment>

As illustrated in FIG. 4A, the damping force calculator 45A1 according to the first embodiment includes the referential damping force map 51, the low-pass filter (LPF) 53, a subtractor 55, an adjusted damping force calculator 57, and an adder 59.

As illustrated in FIGS. 4A and 4B, the referential damping force map 51 stores values of a referential damping force that varies in its magnitude responding to variations of the stroke velocity SV acquired by the information acquisition part 43. The values of the referential damping force are actually stored as values of the referential damping force control current.

The damping force calculator 45A1 according to the first embodiment calculates the referential damping force based on: the stroke velocity SV acquired by the information acquisition part 43; and contents stored in the referential damping force map 51.

The referential damping force calculated by the damping force calculator 45 is sent to the adder 59.

The referential damping force is a damping force used as a reference that is pre-configured to respond to variation of the stroke velocity SV.

In the present embodiment, the frequency-shaping for suppressing (removing) a low-frequency component of the time-series signal of stroke velocity SV is performed; the adjusted damping force is calculated using the time-series signal of stroke velocity SV on which the frequency-shaping has been performed (i.e., high-frequency component of the time-series signal of stroke velocity SV); and the referential damping force is adjusted using the calculated adjusted damping force.

This makes it possible to sufficiently secure the damping force of the high-frequency component of the stroke velocity SV, which is useful to suppress vibration near a system resonance point, and at the same time to obtain the target damping force capable of suppressing the damping force of the low-frequency component of the stroke velocity SV, which impairs the ride quality of the vehicle 10, to a low level.

As seen in FIG. 4B, a variation region (domain) of the stroke velocity SV of the target damping force map 51 includes a normal use region SV1 and non-normal use regions SV2. The normal use region SV1 is a velocity region in which a magnitude of the stroke velocity SV is equal to or smaller than a normal use velocity threshold SVTh ($|SV|-SVTh\geq 0$). During the regular running of the vehicle, most values of the stroke velocity SV converge into the normal use region SV1.

The normal use velocity threshold SVTh may be configured to an appropriate value by referring to an evaluation result acquired by evaluating a probability density function of the stroke velocity SV through experiments, simulations, and the like; and by considering that a predetermined distribution ratio is satisfied by a distribution ratio of the stroke velocity SV appearing respectively in the normal use region SV1 and the non-normal use regions SV2.

As seen in FIG. 4B, the referential damping force characteristic in the normal use region SV1 of the referential damping force map 51 is such that as the stroke velocity SV increases in the direction toward the stretching side, the referential damping is increased in the direction toward the contraction side substantially linearly, whereas as the stroke velocity SV increases in the direction toward the contraction side, the referential damping force is increased in the direction toward the stretching side substantially linearly. This characteristic follows damping characteristics of conventionally used hydraulic dampers. Note that when the stroke velocity SV is zero, the corresponding referential damping force is also zero.

A referential damping force characteristic of the non-normal use region SV2 in the referential damping force map 51, as seen in FIG. 4B, similarly to the referential damping force characteristic of the normal use region SV1 in the referential damping force map 51, has a characteristic such that the referential damping force directed toward the contraction direction increases substantially linearly as the stroke velocity SV increases toward the extension direction, whereas the referential damping force directed toward the extension direction increases substantially linearly as the stroke velocity SV increases toward the contraction direction.

However, as seen in FIG. 4B, the referential damping force characteristic in the non-normal use region SV2 of the referential damping force map 51 is configured to have a gentle slope as compared with a slope of the referential damping force characteristic in the normal use region SV1 of the referential damping force map 51.

Incidentally, the referential damping force map 51 is commonly applied to the damping force calculators 45A1, 45B1 according to the first and second embodiments.

In the electrically powered suspension system 11, resonance vibration, which derives from moment of inertia (inertia) produced by the drive of the electromagnetic actuator 13 included in the system and rigidity of the electromagnetic actuator 13, strongly appears near the system resonance point (where a resonance frequency frs is approximately 40 to 100 Hz, see FIG. 4C).

If an amount of control on the damping force is increased throughout the entire frequency band in order to obtain an effect of suppressing the vibration near the system resonance point, the damping characteristic shifts to hard damping in response to the increase in the amount of control on the damping force in a frequency band that is lower than the resonance frequency frs of the system resonance point. This causes a problem of the impaired ride quality of the vehicle 10.

With this taken into consideration, the electrically powered suspension system 11 according to the present invention includes the LPF 53, the subtractor 55 and the adjusted damping force calculator 57, as well as calculates the adjusted damping force for adjusting the amplitude of the target damping force, for the purpose of sufficiently obtaining the effect of suppressing the vibration near the system resonance point while keeping the ride quality of the vehicle excellent.

Specifically, the low-pass filter (LPF) 53 has a low-pass filter process function of extracting the low-frequency component from the stroke velocity SV acquired by the information acquisition part 43. The LPF 53 includes, for example, a digital filter. As illustrated in FIG. 4C, a cutoff frequency fc of the LPF 53 is set at a frequency (30 Hz in the example illustrated in FIG. 4C) lower than the frequency frs of the system resonance point of the electrically powered suspension system 11.

The subtractor 55 subtracts the low-frequency component extracted by the LPF 53 from the stroke velocity SV acquired by the information acquisition part 43. Thus, the frequency-shaping is performed for the stroke velocity SV such that: the low-frequency component is removed from the stroke velocity SV; and the high-frequency component accordingly remains.

The information on the stroke velocity SV_afs after the frequency-shaping, which is outputted from the subtractor 55, is inputted into the adjusted damping force calculator 57.

The adjusted damping force calculator 57 calculates the adjusted damping force for suppressing the system resonance of the electrically powered suspension system 11, based on an adjusted damping force map Fmp that uses the stroke velocity SV_afs after the frequency-shaping as an argument. The adjusted damping force map Fmp stores information related to the adjusting damping force which changes in response to variations of the stroke velocity SV_afs after the frequency-shaping. The adjusted damping force map Fmp corresponds to an "adjusted damping force function" according to the present invention.

The adjusted damping force calculated by the adjusted damping force calculator 57 is sent to the adder 59.

<Internal Configuration of Damping Force Calculator 45B1 of Second Embodiment>

Figure 4D:
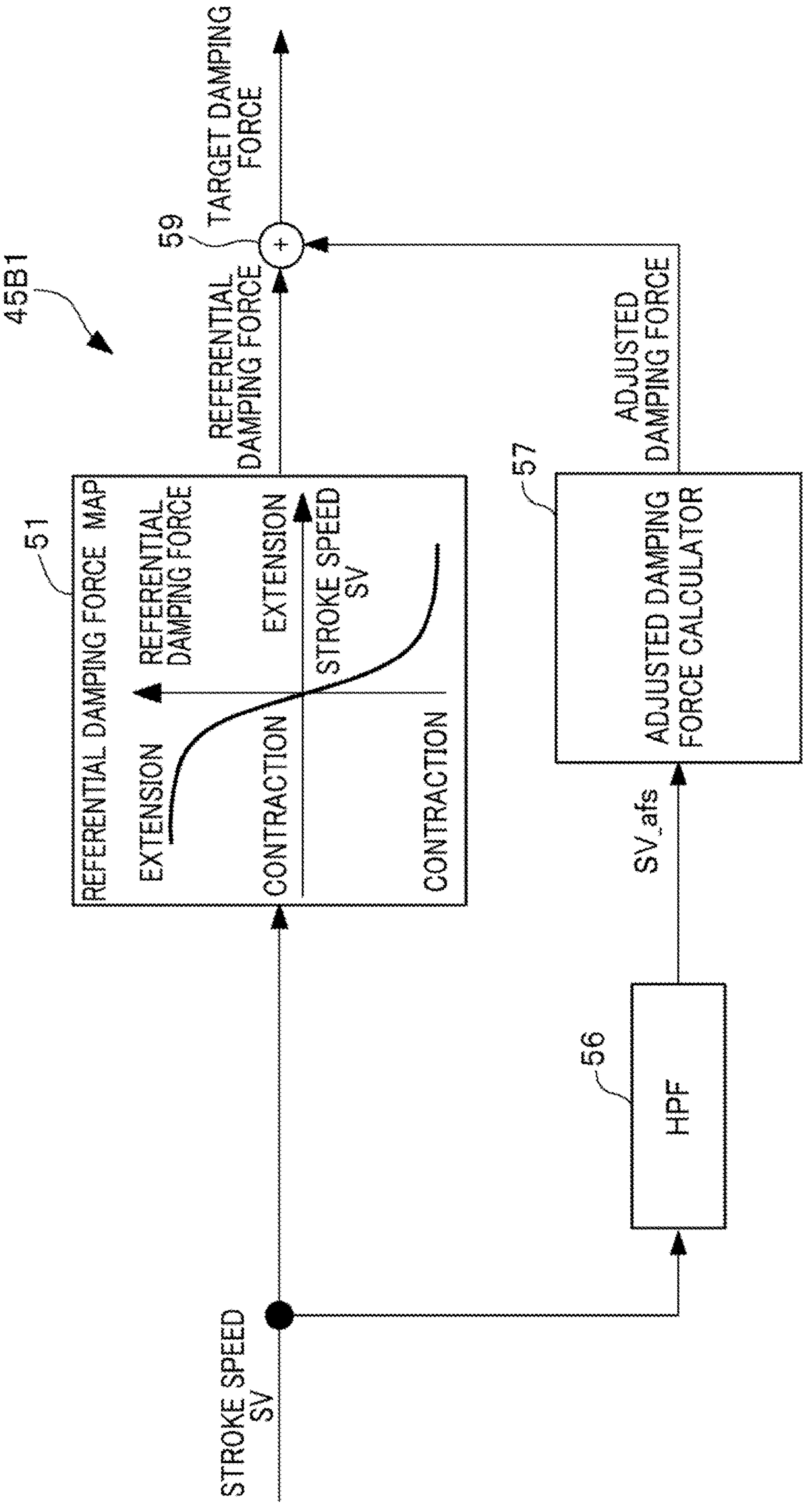
FIG. 4D is an explanatory diagram conceptually illustrating an internal configuration of a damping force calculator included in the ECU according to the second embodiment.
Figure 4E:
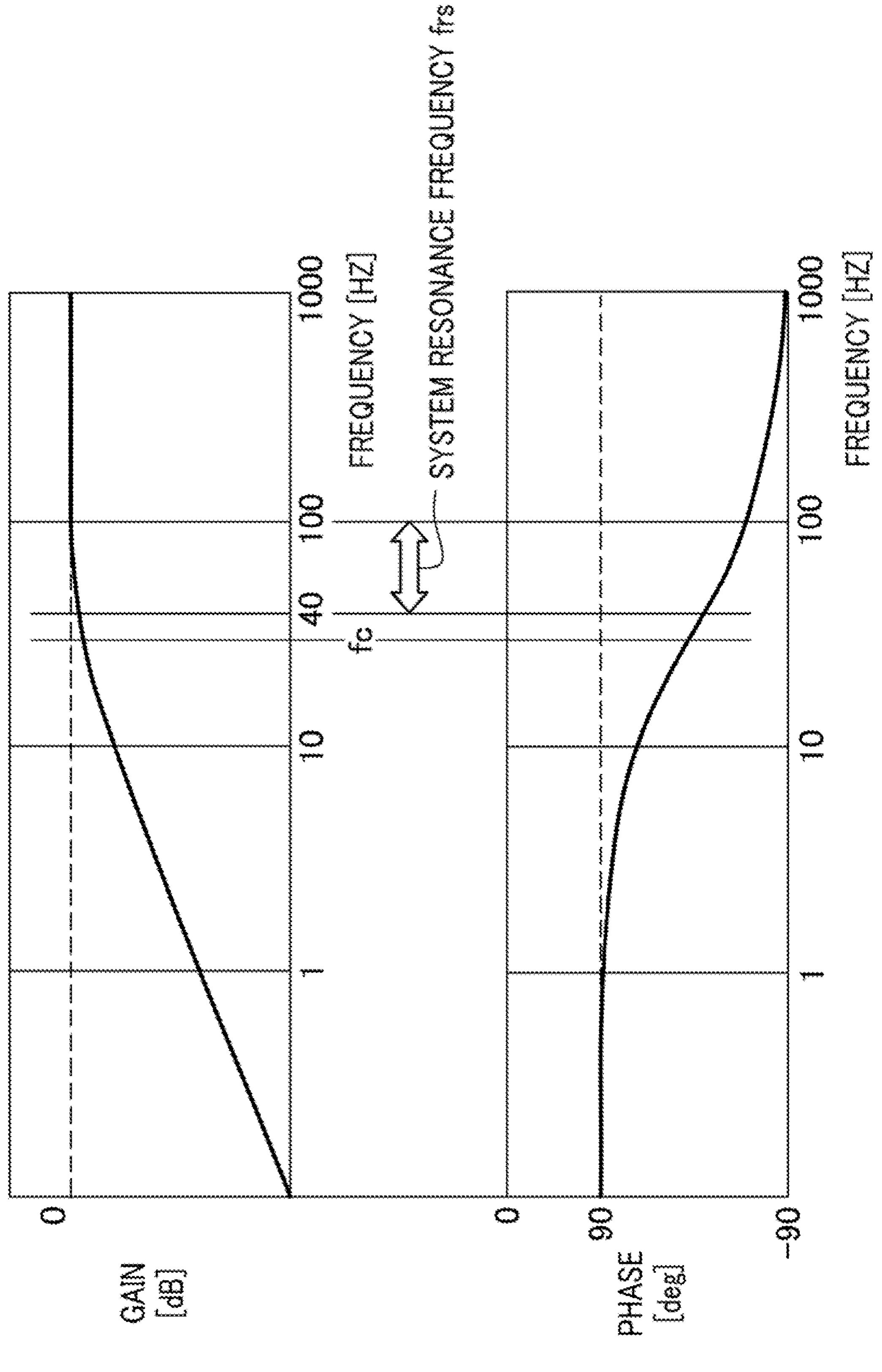
FIG. 4E is an explanatory diagram illustrating a frequency characteristics of a gain and a phase of a high-pass filter included in a damping force calculator according to the second embodiment.

Next, referring to FIGS. 4D and 4E, description is provided of the damping force calculator 45B1 according to the second embodiment with a focus put on what makes the damping force calculator 45B1 different from the damping force calculator 45A1 according to the first embodiment.

FIG. 4D is a diagram conceptually illustrating the internal configuration of the damping force calculator 45B1 according to the second embodiment. FIG. 4E is an explanatory diagram illustrating frequency characteristics of a gain and a phase of the high-pass filter 56 included in the damping force calculator 45B1 according to the second embodiment.

As illustrated in FIG. 4D, the damping force calculator 45B1 according to the second embodiment includes the referential damping force map 51, the high-pass filter (HPF) 56, the adjusted damping force calculator 57 and the adder 59.

The high-pass filter (HPF) 56 has a high-pass filtering function of extracting the high-frequency component from the stroke velocity SV acquired by the information acquisition part 43. Through the high-pass filtering, the frequency-shaping is performed for the stroke velocity SV such that: the low-frequency component is removed from the stroke velocity SV; and the high-frequency component accordingly remains.

The HPF 56 is formed from, for example, a digital filter. As illustrated in FIG. 4E, the cutoff frequency fc of the HPF 56 is set at a frequency (30 Hz in the example illustrated in FIG. 4E) lower than the frequency frs of the system resonance point of the electrically powered suspension system 11.

It should be noted that the information on the stroke velocity SV_afs after the frequency-shaping, which velocity is outputted from the subtractor 55 in the damping force calculator 45A1 according to the first embodiment, and the information on the stroke velocity SV after the frequency-shaping outputted through the high-pass filtering by the damping force calculator 45B1 according to the second embodiment are substantially the same as or similar to each other.

This means that the present invention's object of suppressing the damping force of the low-frequency component of the stroke velocity SV high-pass filtering impairs the ride quality of the vehicle 10, to a low level while sufficiently securing the damping force of the high-frequency component of the stroke velocity SV can be achieved using either the damping force calculator 45A1 according to the first embodiment high-pass filtering uses the low-pass filter 53 or the damping force calculator 45B1 (see FIG. 4D) according to the second embodiment high-pass filtering uses the high-pass filter 56.

The adjusted damping force calculator 57 works to calculate the adjusted damping force based on the information on the stroke velocity SV after the frequency-shaping by the high-pass filtering.

Incidentally, the adjusted damping force calculator 57 and the adder 59 play their respective roles common to the damping force calculators 45A1, 45B1 according to the first and second embodiments.

The adjusted damping force calculated by the adjusted damping force calculator 57 is sent to the adder 59.

<Adjusted Damping force Map Fmp1 to Fmp3 of First to Third Example>

Figure 5A:
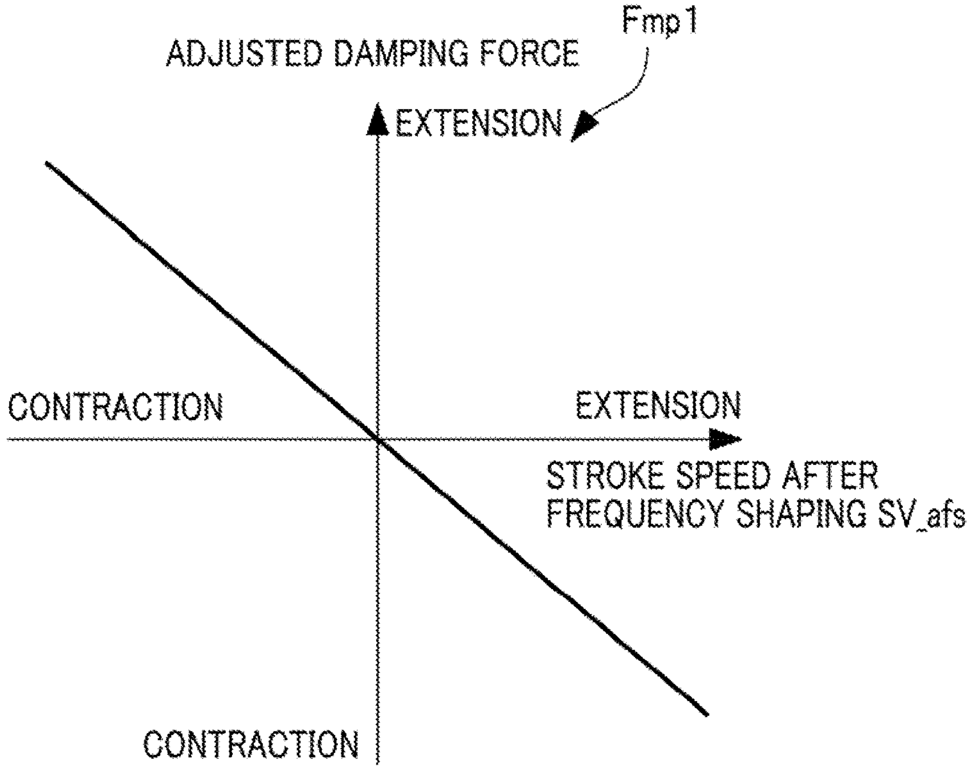
FIG. 5A is an explanatory diagram illustrating a first example of an adjusted damping force map.
Figure 5B:
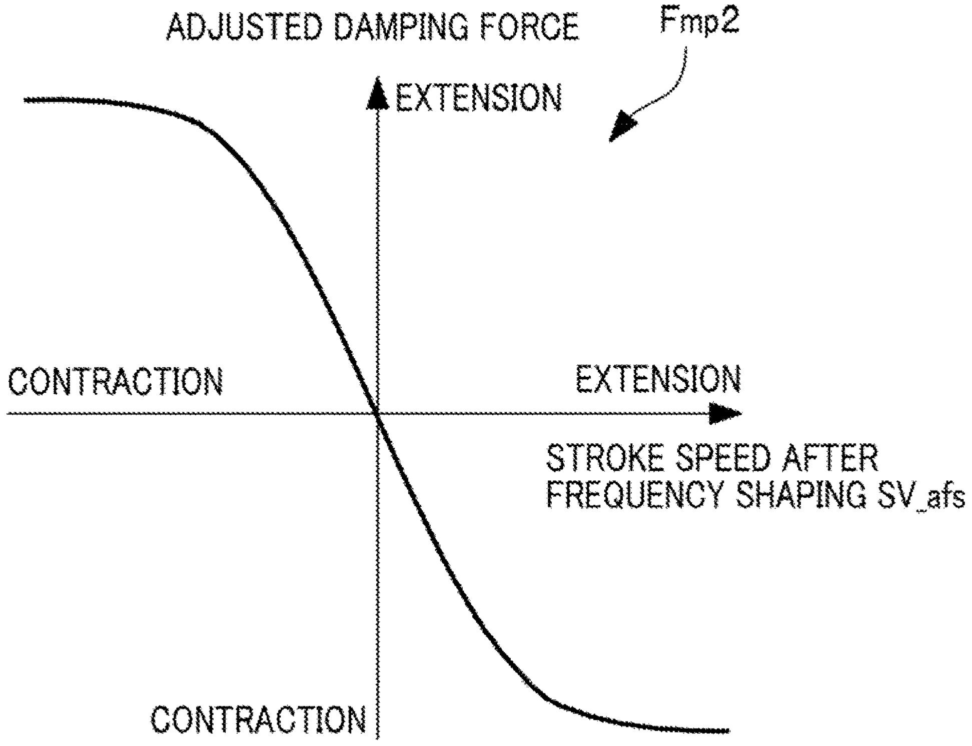
FIG. 5B is an explanatory diagram illustrating a second example of the adjusted damping force map.
Figure 5C:
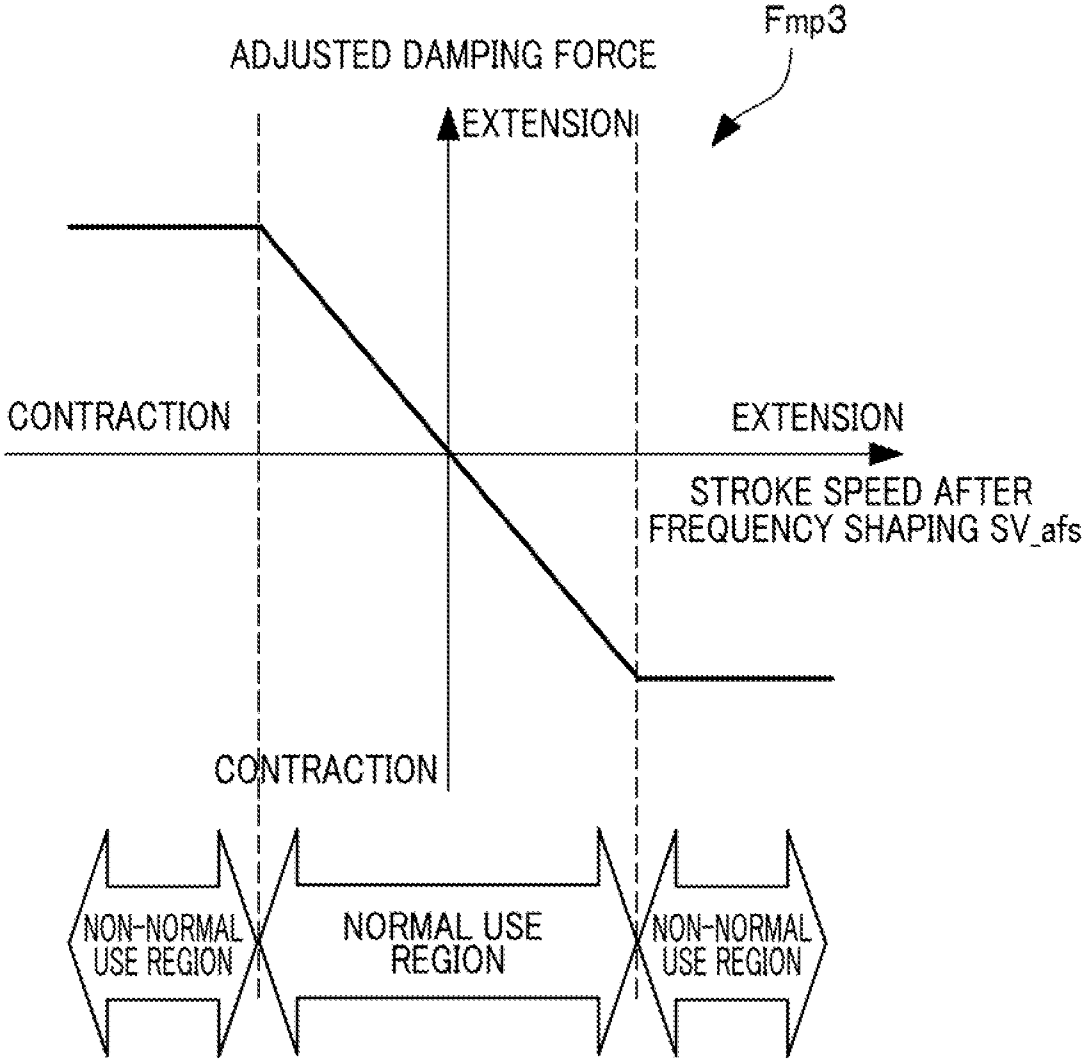
FIG. 5C is an explanatory diagram illustrating the adjusted damping force map according to a third example.

In this respect, referring to FIGS. 5A to 5C, description is provided of adjusted damping force maps Fmp1 to Fmp3 according to first to third examples high-pass filtering are applied to the stroke velocity SV_afs after the frequency-shaping in the damping force calculators 45A1, 45B1 according to the first and second embodiments. FIGS. 5A to 5C are explanatory diagrams of the adjusted damping force maps Fmp1 to Fmp3 according to first to third examples high-pass filtering are referred to when the adjusted damping force for adjusting the target damping force is calculated.

Incidentally, the adjusted damping force maps Fmp1 to Fmp3 according to the first to third examples are commonly applied to the damping force calculators 45A1, 45B1 according to the first and second embodiments.

The adjusted damping force map Fmp1 according to a first example may employ, for example, as illustrated in FIG. 5A, a configuration in which: the adjusted damping force in a direction to a contracted side becomes linearly larger as the stroke velocity SV_afs after the frequency-shaping becomes larger in a direction to a stretched side; and the adjusted damping force in the direction to the stretched side becomes linearly larger as the stroke velocity SV_afs after the frequency-shaping becomes larger in the direction to the contracted side.

This means that the adjusted damping force is obtained by multiplying the stroke velocity SV_afs after the frequency-shaping by a predetermined resonance suppression gain (a fix value).

Meanwhile, the adjusted damping force map Fmp2 according to a second example may employ, as illustrated in FIG. 5B, a configuration having a characteristic of the stroke velocity SV_afs after the frequency-shaping versus the adjusted damping force high-pass filtering is similar to the characteristic of the stroke velocity SV versus the referential damping force in the referential damping force map 51.

Furthermore, the adjusted damping force map Fmp3 according to a third example may employ, for example, as illustrated in FIG. 5C, a configuration in which: in a common use area of the stroke velocity SV_afs after the frequency-shaping, the adjusted damping force in the direction to the contracted side becomes linearly larger as the stroke velocity SV_afs becomes larger in the direction to the stretched side; and the adjusted damping force in the direction to the stretched side becomes linearly larger as the stroke velocity SV_afs becomes larger in the direction to the contracted side.

In this case, out of the common use area of the stroke velocity SV_afs after the frequency-shaping, the adjusted damping force map Fmp3 according to the third example has a characteristic in which: the adjusted damping force in the direction to the contracted side remains at a fixed value (limit threshold) although the stroke velocity SV_afs becomes larger in the direction to the stretched side; and the adjusted damping force in the direction to the stretched side remains at the other fixed value (limit threshold) although the stroke velocity SV_afs becomes larger in the direction to the contracted side.

Incidentally, in this description, the adjusted damping force map Fmp is a generic term for the adjusted damping force maps Fmp1 to Fmp3 according to the first to third examples.

Returning to FIG. 4A, descriptions will continue being provided for the damping force calculator 45 according to the first embodiment. The adder 59 obtains the target damping force by adding up the referential damping force calculated by the damping force calculator 45 according to the first embodiment and the adjusted damping force calculated by the adjusted damping force calculator 57. In other words, the target damping force is adjusted using the adjusted damping force calculated by the adjusted damping force calculator 57.

Meanwhile, returning to FIG. 4D, descriptions will continue being provided for the damping force calculator 45 according to the second embodiment. The adder 59 obtains the target damping force by adding up the referential damping force calculated by the damping force calculator 45 according to the second embodiment and the adjusted damping force calculated by the adjusted damping force calculator 57. In other words, the target damping force is adjusted using the adjusted damping force calculated by the adjusted damping force calculator 57.

The drive-force calculator 47 obtains a target driving force based on the target damping force calculated by the damping force calculator 45, and obtains a drive-control signal for achieving the target driving force through an arithmetic operation. The drive-control signal resulting from the drive-force calculator 47's arithmetic operation is sent to the drive-controller 49.

The drive-controller 49 controls the drives of the multiple electromagnetic actuators 13 independently from one another by supplying drive-control currents to the electric motors 31 included in the multiple electromagnetic actuators 13 in accordance with the drive-control signals sent from the drive-force calculator 47, respectively.

Incidentally, for example, an inverter control circuit can be suitably used to generate the drive-control currents to be supplied to the electric motors 31.

<Operation of Electrically Powered Suspension System 11 According to Embodiment>

Figure 6:
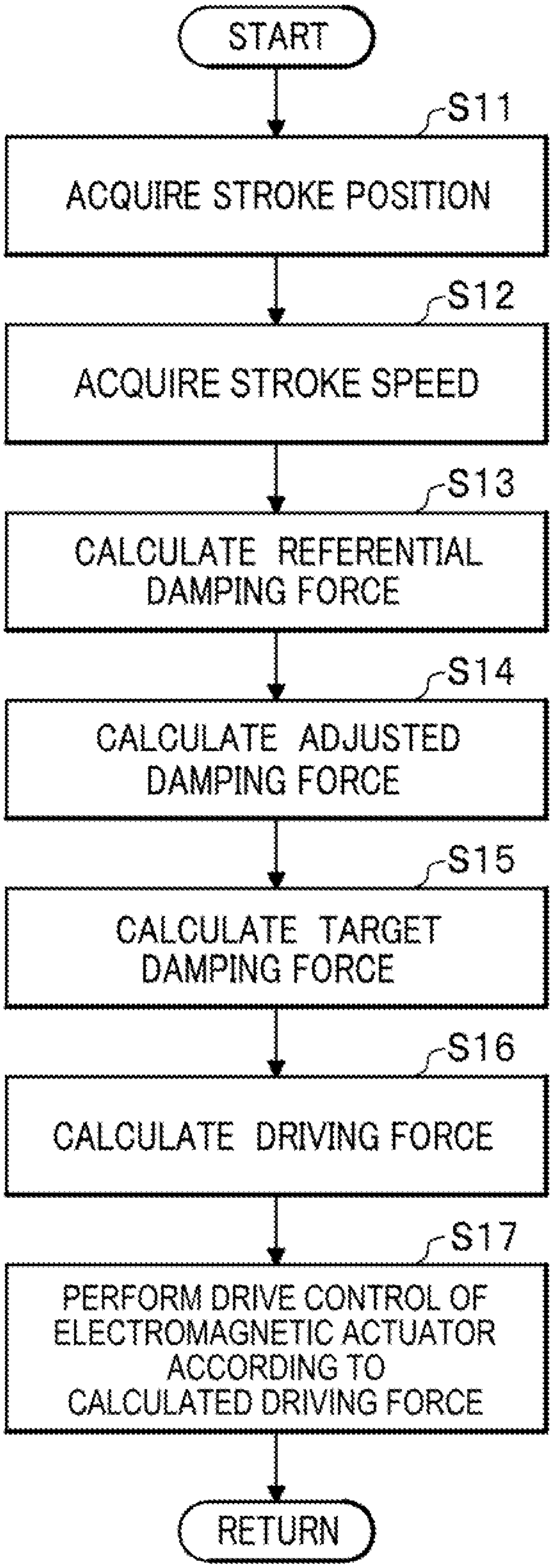
FIG. 6 is a flowchart describing an operation of the electrically powered suspension system according to the present invention.

Next, description is given of an operation of the electrically powered suspension system 11 according to the embodiment of the present invention with reference to FIG. 6, which is a flowchart illustrating the operation of the electrically powered suspension system 11 according to the embodiment of the present invention.

In step S11: "Acquire stroke position" shown in FIG. 6, the information acquisition part 43 of the ECU 15 receives a signal of a rotation angle of the electric motor 31 detected by the resolver 37 as time-series information on a stroke position.

In step S12: "Acquire stroke speed", the information acquisition part 43 of the ECU 15 time-differentiates this time-series information on the stroke position to acquire information on a stroke speed SV. The information on the stroke speed SV obtained in this manner is sent to the driving force calculator 45. The information on the sprung speed BV acquired in this way is sent to the driving force calculator 47.

In step S13 "Calculate referential damping force", the damping force calculator 45 of the ECU 15 calculates the referential damping force considered as a candidate for a target damping force by referring to the information on the stroke velocity SV acquired in step S12 and the referential damping force map 51. Information on the calculated referential damping force is sent to an adder 59 of the damping force calculator 45.

In step S14 "Calculate adjusted damping force", an LPF 53 included in the damping force calculator 45A1 included in the ECU 15 according to the first embodiment extracts a low-frequency component from the stroke velocity SV acquired in step S12.

Subsequently, a subtractor 55 included in the damping force calculator 45A1 according to the first embodiment subtracts the low-frequency component extracted by the LPF 53 from the stroke velocity SV acquired in step S12. Thereby, a frequency-shaping is performed for the stroke velocity SV such that the low-frequency component is to be removed from the stroke velocity SV and the high-frequency component accordingly remains.

Next, the adjusted damping force calculator 57 included in the damping force calculator 45A1 according to the first embodiment calculates an adjusted damping force for suppressing a system resonance of the electrically powered suspension system 11, by referring to the adjusted damping force map Fmp that uses a stroke velocity SV_afs after the frequency-shaping as an argument.

Further, in step S14 "Calculate adjusted damping force", an HPF 56 included in a damping force calculator 45B1 included in the ECU 15 according to the second embodiment performs a high-pass filtering of extracting a high-frequency component from the stroke velocity SV acquired in step S12. Thereby, a frequency-shaping is performed for the stroke velocity SV so that the low-frequency component is removed from the stroke velocity SV and the high-frequency component accordingly remains.

Next, the adjusted damping force calculator 57 included in the damping force calculator 45B1 according to the second embodiment calculates the adjusted damping force for suppressing the system resonance of the electrically powered suspension system 11, by referring to the adjusted damping force map Fmp that uses the stroke velocity SV_afs after the frequency-shaping as an argument.

In step S15 (Calculate target damping force), an adder 59 included in the damping force calculator 45 of the ECU 15 calculates a target damping force by adding up the referential damping force calculated in the step S13 and the adjusted damping force calculated in the step S14. In other words, the damping force calculator 45 calculates the target damping force by adjusting the target damping force with the adjusted damping force.

In step S16: "Calculate driving force", the driving force calculator 47 in the ECU 15 obtains the target driving force based on the target damping force calculated in step S15, and obtains a drive control signal for obtaining the target driving force through an arithmetic operation.

In step S17, the drive-controller 49 in the ECU 15 controls the drives of the plurality of the electromagnetic actuators 13 by supplying the drive-control power respectively to the electric motors 31 included in the plurality of the electromagnetic actuators 13 in accordance with the drive-control signals obtained by the arithmetic operation in step S16.

<Internal Configuration of Damping Force Calculator 45A2 in ECU 15 of Modification of First Embodiment>

Figure 7A:
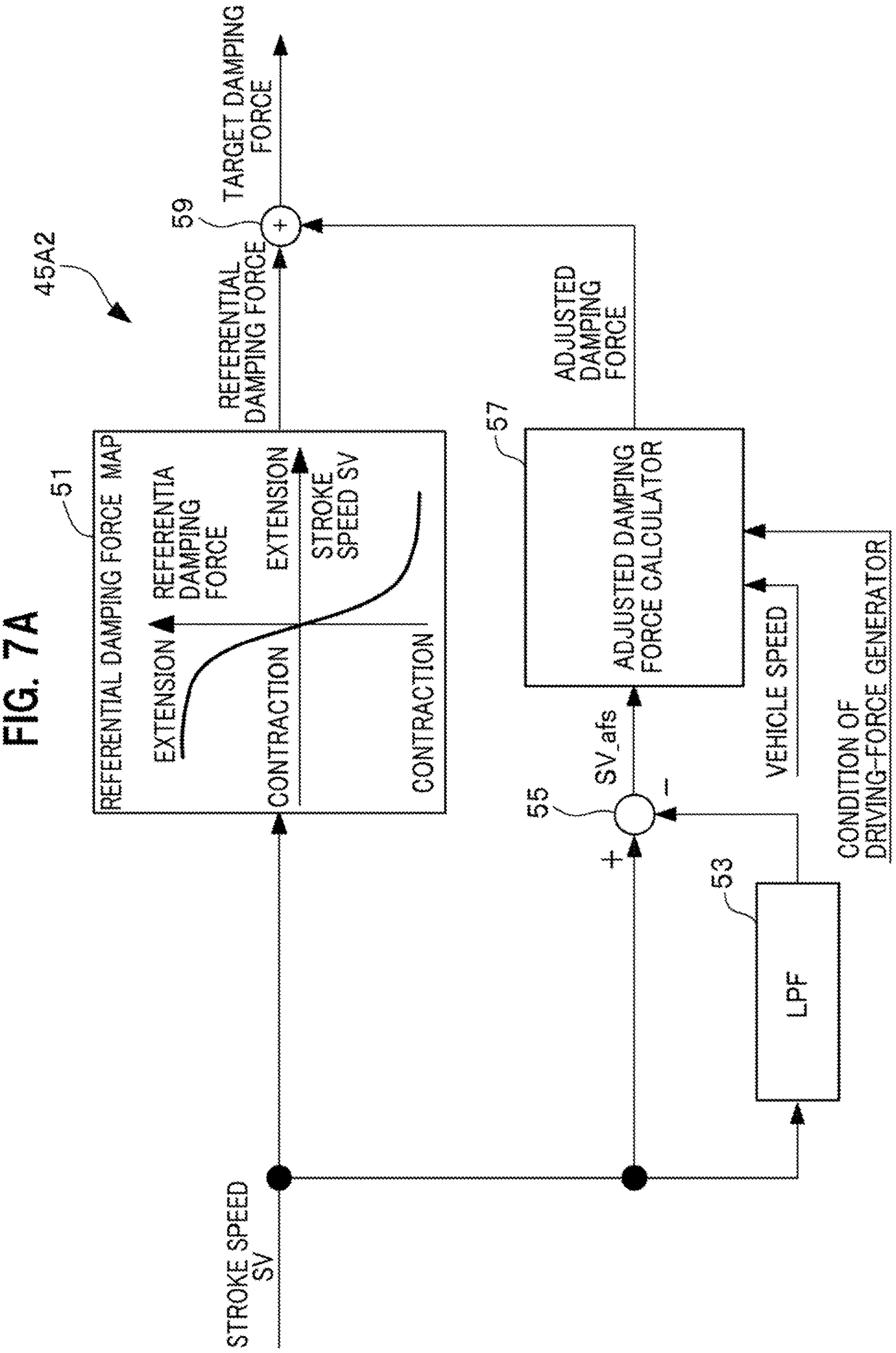
FIG. 7A is a diagram conceptually illustrating an internal configuration of a damping force calculator included in the ECU according a first modification of the first embodiment.

Next, referring to FIG. 7A, description is provided of an internal configuration of a damping force calculator 45A2 according to a modification of the first embodiment included in the ECU 15 in the electrically powered suspension system 11 according to the present invention. FIG. 7A is a diagram conceptually illustrating the internal configuration of the damping force calculator 45A2 according to the modification of the first embodiment included in the ECU 15.

Many elements are common to the damping force calculator 45A1 according to the first embodiment illustrated in FIG. 4A and the damping force calculator 45A2 according to the modification of the first embodiment illustrated in FIG. 7A.

Accordingly, description is given of the configuration of the electrically powered suspension system 11 including the damping force calculator 45A2 according to the modification of the first embodiment by discussing mainly what makes the damping force calculator 45A2 according to the modification of the first embodiment different from the damping force calculator 45A1 according to the first embodiment.

The electrically powered suspension system 11 including the damping force calculator 45A2 according to the modification of the first embodiment is different from the electrically powered suspension system 11 including the damping force calculator 45A1 according to the first embodiment in that: the information acquisition part 43 further acquires the information on the vehicle speed, and information on a condition of a driving force generator (not illustrated) high-pass filtering generates a driving force of the vehicle 10; and the adjusted damping force calculator 57 included in the damping force calculator 45A2 according to the modification of the first embodiment included in the ECU 15 receives the information on the vehicle speed and the information on the condition of the driving force generator high-pass filtering are acquired by the information acquisition part 43, as well as adjusts (inclusively changes) the characteristic of the adjusted damping force map Fmp based on at least one of the two received kinds of information.

It should be noted that description is provided below of effects of the electrically powered suspension system 11 including the damping force calculator 45A2 according to the modification of the first embodiment.

<Internal Configuration of Damping Force Calculator 45B2 in ECU 15 of Modification of Second Embodiment>

Figure 8A:
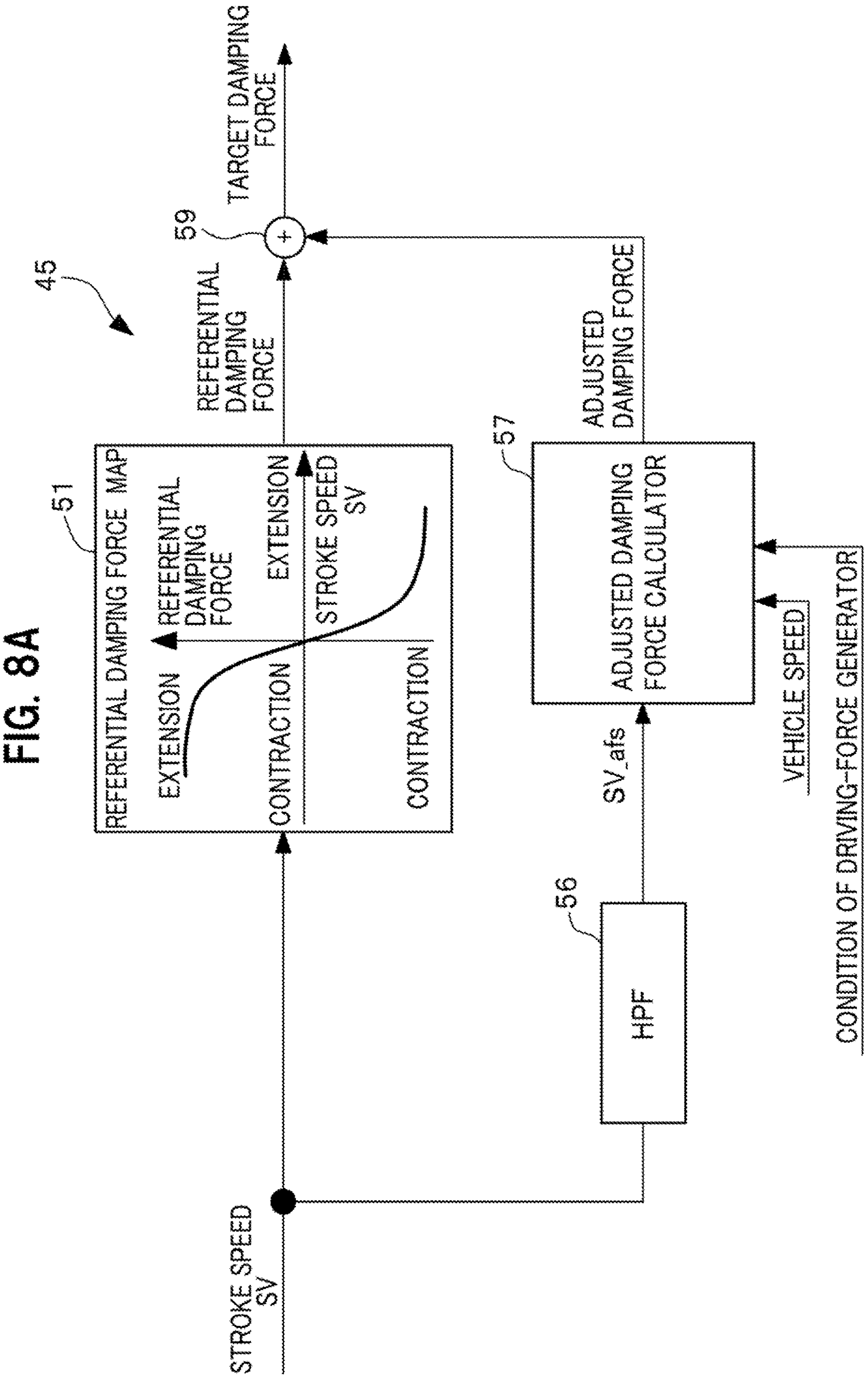
FIG. 8A is a diagram conceptually illustrating an internal configuration of a damping force calculator included in the ECU according to the second embodiment.
Figure 8B:
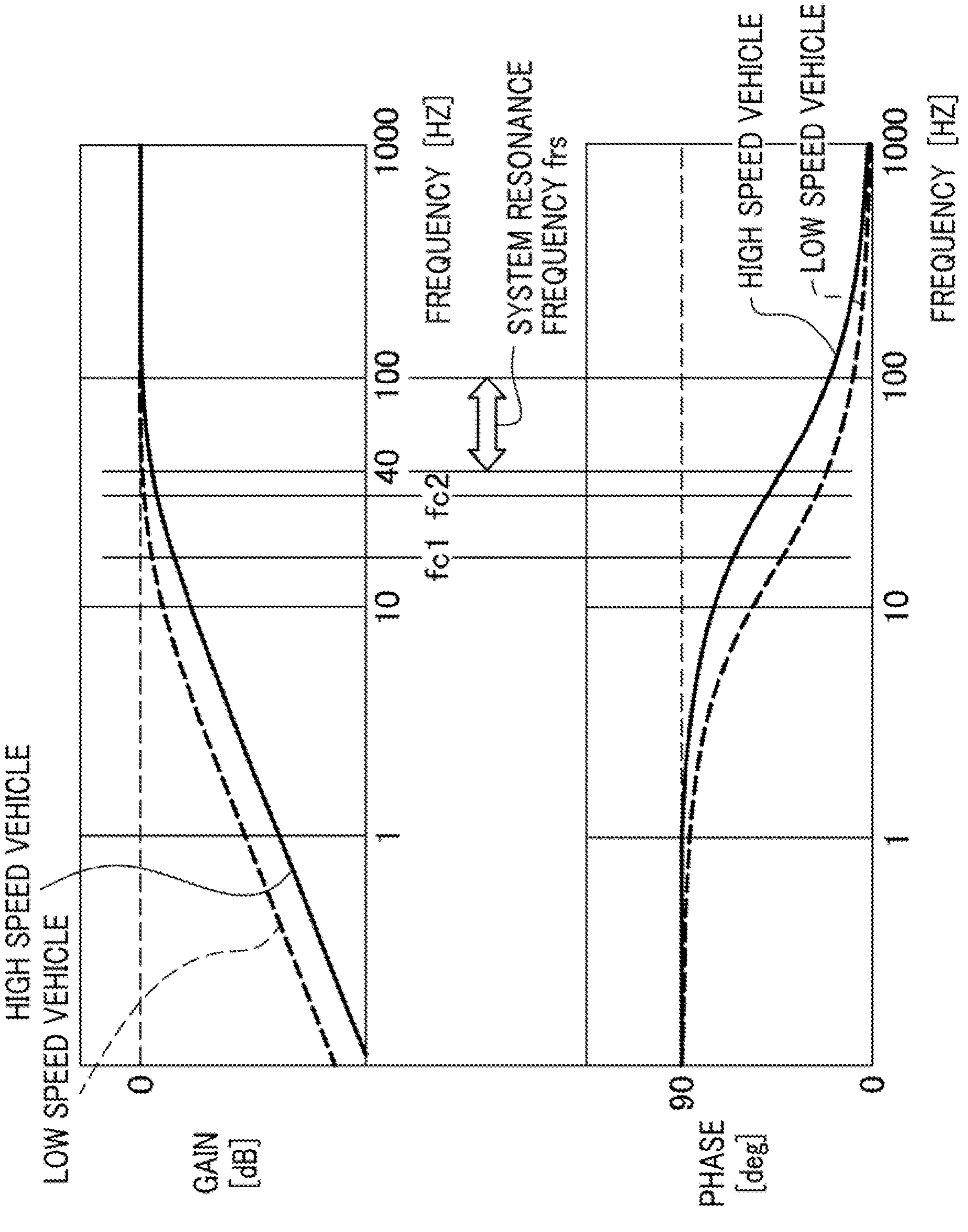
FIG. 8B is an explanatory diagram illustrating a frequency characteristics of a gain and a phase of a high-pass filter included in the damping force calculator according to the first modification of the second embodiment.

Next, referring to FIG. 8A, description is provided of an internal configuration of a damping force calculator 45B2 according to the modification of the second embodiment included in the ECU 15 of the electrically powered suspension system 11 according to the present invention. FIG. 8A is a diagram conceptually illustrating the internal configuration of the damping force calculator 45B2 according to the modification of the second embodiment included in the ECU 15.

Most elements are common to the damping force calculator 45B1 according to the second embodiment illustrated in FIG. 4D and the damping force calculator 45B2 according to the modification of the second embodiment illustrated in FIG. 8A.

With this taken into the consideration, the configuration of the electrically powered suspension system 11 including the damping force calculator 45B2 according to the modification of the second embodiment is described by discussing mainly what makes the damping force calculator 45B2 according to the modification of the second embodiment different from the damping force calculator 45B1 according to the second embodiment.

The electrically powered suspension system 11 including the damping force calculator 45B2 according to the modification of the second embodiment is different from the electrically powered suspension system 11 including the damping force calculator 45B1 according to the second embodiment in that: the information acquisition part 43 further acquires the information on the vehicle speed, and information on a condition of a driving force generator (not illustrated) that generates the driving force of the vehicle 10; and the adjusted damping force calculator 57 included in the damping force calculator 45B2 according to the modification of the second embodiment included in the ECU 15 receives at least one of the information on the vehicle speed and the information on the condition of the driving force generator acquired by the information acquisition part 43, as well as adjusts (inclusively changes) the characteristic of the adjusted damping force map Fmp based on one or two kinds of the received information.

It should be noted that description is provided below for effects of the electrically powered suspension system 11 including the damping force calculator 45B2 according to the modification of the second embodiment.

<Effect of Electrically Powered Suspension System 11 of Embodiment>

It is assumed that the electrically powered suspension systems 11 exhibits a resonance vibration near a system resonance point (where a resonance frequency frs is approximately 40 to 100 Hz) according to the embodiments of the present invention, which resonance vibration is due sources such as an inertial moment (the inertia) caused by driving the electromagnetic actuator 13 included in the system.

If an amount of control on the damping force is increased throughout an entire frequency band in order to obtain an effect of suppressing the vibration near the system resonance point, the damping characteristic shifts to the strong damping in a frequency band (f<frs) high-pass filtering is lower than the resonance frequency frs of the system resonance point, in response to the increase in the amount of control on the damping force. This causes a problem of the impaired ride quality of the vehicle 10.

With the above taken into consideration, the electrically powered suspension system 11 based on a first aspect includes: the electromagnetic actuator 13 provided between the vehicle body and each wheel of the vehicle 10, and generating the driving force for the damping operation of the vehicle body; the information acquisition part 43 that acquires the information on the stroke velocity SV of the electromagnetic actuator 13; the damping force calculator 45 that calculates the target damping force as the target value of the damping operation of the electromagnetic actuator 13, based on the information on the stroke velocity SV acquired by the information acquisition part 43; and the drive-controller 49 high-pass filtering controls the drive of the electromagnetic actuator 13 using the target driving force based on the target damping force calculated by the damping force calculator 45.

The damping force calculator 45 shapes frequency to suppress the low-frequency component of the stroke velocity SV, calculates the adjusted damping force based on the information on the stroke velocity SV_afs after the frequency-shaping, and adjusts the target damping force using the calculated adjusted damping force.

The electrically powered suspension system 11 based on the first aspect corresponds to the electrically powered suspension system 11 including the damping force calculator 45A1 (see FIG. 4A) according to the first embodiment.

In the electrically powered suspension system 11 according to the first aspect, the damping force calculator 45 perform the frequency shaping for suppressing the low-frequency component of the stroke velocity SV, calculates the adjusted damping force based on the information on the stroke velocity SV_afs after the frequency-shaping, and adjusts the target damping force using the calculated adjusted damping force.

This allows to sufficiently secure the damping force for the high-frequency component that is useful to suppress the vibration near the system resonance point, and at the same time to obtain the target damping force capable of suppressing to a low level the damping force for the low-frequency component high-pass filtering impairs the ride quality of the vehicle 10.

The electrically powered suspension system 11 based on the first aspect is able to appropriately suppress the vibration near the system resonance point while keeping the ride quality of the vehicle 10 excellent. Thus, the electrically powered suspension system 11 according to the first aspect can keep the quietness inside the vehicle compartment by suppressing the noise due to the resonance vibration.

The electrically powered suspension system 11 according to a second aspect includes the electromagnetic actuator 13, the information acquisition part 43, the damping force calculator 45 and the drive-controller 49, similarly to the electrically powered suspension system 11 according to the first aspect.

The damping force calculator 45 includes: the low-pass filter 53 that extracts the low-frequency component from the stroke velocity SV; the subtractor 55 high-pass filtering subtracts the extracted low-frequency component from the stroke velocity SV; and the adjusted damping force calculator 57 high-pass filtering calculates the adjusted damping force based on the stroke velocity SV_afs after frequency-shaping by the subtraction. The damping force calculator 45 adjusts the target damping force using the calculated adjusted damping force.

Similarly to the electrically powered suspension system 11 according to the first aspect, the electrically powered suspension system 11 according to the second aspect corresponds to the electrically powered suspension system 11 including the damping force calculator 45A1 (see FIG. 4A) according to the first embodiment.

The electrically powered suspension system 11 according to the second aspect is different from the electrically powered suspension system 11 according to the first aspect in that the damping force calculator 45 is specifically configured to include the low-pass filter 53, the subtractor 55, and the adjusted damping force calculator 57.

In other words, the electrically powered suspension system 11 according to the second aspect makes the low-pass filter 53 of the damping force calculator 45 extract the low-frequency component from the stroke velocity SV. The subtractor 55 subtracts the extracted low-frequency components from the stroke velocity SV. The adjusted damping force calculator 57 calculates the adjusted damping force based on the stroke velocity SV_afs after the frequency-shaping by the subtraction. Thereafter, the damping force calculator 45 adjusts the target damping force using the calculated adjusted damping force.

Similarly to the electrically powered suspension system 11 according to the first aspect, the electrically powered suspension system 11 according to the second aspect can appropriately suppress the vibration near the system resonance point while keeping the ride quality of the vehicle 10 excellent. Thus, the electrically powered suspension system 11 according to the second aspect can keep the quietness inside the vehicle compartment by suppressing the noise due to the resonance vibration.

The electrically powered suspension system 11 according to a third aspect includes the electromagnetic actuator 13, the information acquisition part 43, the damping force calculator 45 and the drive-controller 49, similarly to the electrically powered suspension system 11 according to the first or second aspect.

The damping force calculator 45 includes: the high-pass filter 56 that performs a step of extracting the high-frequency component from the stroke velocity SV; and the adjusted damping force calculator 57 that calculates the adjusted damping force based on the stroke velocity SV_afs after the frequency-shaping. The damping force calculator 45 adjusts the target damping force using the calculated adjusted damping force.

The electrically powered suspension system 11 according to the third aspect corresponds to the electrically powered suspension system 11 including the damping force calculator 45B1 (see FIG. 4D) according to the second embodiment.

The electrically powered suspension system 11 according to the third aspect is different from the electrically powered suspension system 11 according to the first aspect in that as the specific configuration of the damping force calculator 45, the damping force calculator 45 includes the high-pass filter 56 and the adjusted damping force calculator 57.

Specifically, the electrically powered suspension system 11 according to the third aspect the high-pass filter 56 of the damping force calculator 45 extracts the high-frequency component from the stroke velocity SV. The adjusted damping force calculator 57 calculates the adjusted damping force based on the stroke velocity SV_afs after the frequency-shaping by the process. Thereafter, the damping force calculator 45 adjusts the target damping force using the calculated adjusted damping force.

Similarly to the electrically powered suspension system 11 according to the second aspect, the electrically powered suspension system 11 according to the third aspect can appropriately suppress the vibration near the system resonance point while keeping the excellent ride quality of the vehicle 10. Thus, the electrically powered suspension system 11 according to the third aspect can keep the quietness inside the vehicle compartment by suppressing the noise deriving from the resonance vibration.

Moreover, the electrically powered suspension system 11 according to a fourth aspect is the electrically powered suspension system 11 according to the second aspect, wherein the cutoff frequency fc of the low-pass filter 53 is set at a frequency lower than the resonance frequency frs of the system resonance point of the electrically powered suspension system 11, as illustrated in FIG. 4C.

The electrically powered suspension system 11 according to the fourth aspect corresponds to the electrically powered suspension system 11 including the damping force calculator 45A1 (see FIG. 4A) according to the first embodiment.

Specifically, a frequency component whose frequency is lower than the resonance frequency frs of the system resonance point is extracted from the stroke velocity SV by the working of the low-pass filter 53 whose cutoff frequency fc is lower than the resonance frequency frs of the system resonance point. The subtractor 55 subtracts the extracted low-frequency component from the stroke velocity SV. Based on the stroke velocity SV_afs after the frequency-shaping by the subtraction, the adjusted damping force calculator 57 calculates the adjusted damping force for suppressing the system resonance vibration of the electrically powered suspension system 11. Thereafter, the damping force calculator 45 adjusts the target damping force using the calculated adjusted damping force.

In the electrically powered suspension system 11 according to the fourth aspect, the cutoff frequency fc of the low-pass filter 53 is set at the frequency lower than the resonance frequency frs of the system resonance point of the electrically powered suspension system 11. For this reason, like the electrically powered suspension system 11 according to the second aspect, the electrically powered suspension system 11 according to the fourth aspect can appropriately suppress the vibration near the system resonance point while keeping the ride quality of the vehicle 10 excellent. Thus, the electrically powered suspension system 11 according to the fourth aspect can keep the quietness inside the vehicle compartment by suppressing the noise deriving from the resonance vibration.

The electrically powered suspension system 11 according to a fifth aspect is the electrically powered suspension system 11 according to the second aspect, and may employ a configuration in which the adjusted damping force calculator 57 performs a calculation based on the adjusted damping force map (adjusted damping force function) Fmp high-pass filtering uses as an argument the stroke velocity SV_afs after the frequency-shaping using the low-pass filter 53 and the subtractor 55.

The electrically powered suspension system 11 according to the fifth aspect corresponds to the electrically powered suspension system 11 including the damping force calculator 45A1 (see FIG. 4A) according to the first embodiment.

In the electrically powered suspension system 11 according to the fifth aspect, the adjusted damping force calculator 57 calculates the adjusted damping force based on the adjusted damping force map (adjusted damping force function) Fmp that uses as the argument the stroke velocity SV_afs after the frequency-shaping using the low-pass filter 53 and the subtractor 55. Thus, the electrically powered suspension system 11 according to the fifth aspect can adjust the target damping force using the calculated adjusted damping force to sufficiently secure the damping force for the high-frequency component of the stroke velocity SV high-pass filtering is useful to suppress the vibration near the system resonance point, and at the same time appropriately obtain the target damping force capable of suppressing to a low level the damping force for the low-frequency component of the stroke velocity SV that impairs the ride quality of the vehicle 10.

Furthermore, the electrically powered suspension system 11 according to a sixth aspect is the electrically powered suspension system 11 according to the third aspect in which the cutoff frequency fc of the high-pass filter 56 is set at the frequency lower than the resonance frequency frs of the system resonance point of the electrically powered suspension system 11.

The electrically powered suspension system 11 according to the sixth aspect corresponds to the electrically powered suspension system 11 including the damping force calculator 45B1 (see FIG. 4D) according to the second embodiment.

Specifically, the process of extracting from the stroke velocity SV the component whose frequency is higher than the resonance frequency frs of the system resonance point is performed by a work of the high-pass filter 56 whose cutoff frequency fc is set lower than the resonance frequency frs of the system resonance point. Based on the stroke velocity SV_afs after the frequency-shaping by the process, the adjusted damping force calculator 57 calculates the adjusted damping force for suppressing the system resonance of the electrically powered suspension system 11. Thereafter, the damping force calculator 45 adjusts the target damping force using the calculated adjusted damping force.

In the electrically powered suspension system 11 according to the sixth aspect, the cutoff frequency fc of the high-pass filter 56 is set at the frequency lower than the resonance frequency frs of the system resonance point of the electrically powered suspension system 11. For this reason, similarly to the electrically powered suspension system 11 according to the third aspect, the electrically powered suspension system 11 according to the sixth aspect can appropriately suppress the vibration near the system resonance point while keeping the excellent ride quality of the vehicle 10. Thus, the electrically powered suspension system 11 according to the sixth aspect can keep the quietness inside the vehicle compartment by suppressing the noise deriving from the resonance vibration.

Meanwhile, the electrically powered suspension system 11 according to a seventh aspect is the electrically powered suspension system 11 according to the sixth aspect, and may employ a configuration in which the adjusted damping force calculator 57 performs as an argument the calculation based on the adjusted damping force map (adjusted damping force function) Fmp that uses the stroke velocity SV_afs after the frequency-shaping using the high-pass filter 56.

In the electrically powered suspension system 11 according to the seventh aspect, the adjusted damping force calculator 57 calculates the adjusted damping force based on the adjusted damping force map (adjusted damping force function) Fmp that uses as the argument the stroke velocity SV_afs after the frequency-shaping using the high-pass filter 56. Thus, the electrically powered suspension system 11 according to the seventh aspect can adjust the target damping force using the calculated adjusted damping force to sufficiently secure the damping force of the high-frequency component of the stroke velocity SV useful to suppress the vibration near the system resonance point, and at the same time appropriately obtain the target damping force capable of suppressing the damping force of the low-frequency component of the stroke velocity SV high-pass filtering impairs the ride quality of the vehicle 10, to a low level.

Further, the electrically powered suspension system 11 according to an eighth aspect is the electrically powered suspension system 11 according to the fifth aspect, and may employ a configuration in which: the information acquisition part 43 further acquires the information on the vehicle speed; and the adjusted damping force calculator 57 adjusts the characteristic of the adjusted damping force map (adjusted damping force function) Fmp based on the vehicle speed acquired by the information acquisition part 43.

The electrically powered suspension system 11 according to the eighth aspect corresponds to the electrically powered suspension system 11 including the damping force calculator 45A2 (see FIG. 7A) according to the modification of the first embodiment.

In the electrically powered suspension system 11 according to the eighth aspect, the adjusted damping force calculator 57 adjusts a characteristic of the adjusted damping force map (adjusted damping force function) Fmp2 based on the vehicle speed acquired by the information acquisition part 43.

Specifically, for example, noise made by the vehicle 10 while running at a speed in a low-speed range (including the stop) is smaller than noise made by the vehicle 10 while running at a speed in a high-speed range. For this reason, when the damping control of the electrically powered suspension system 11 is performed, highly improved quietness is required in the case where the vehicle speed is in the low-speed range than the case where the vehicle speed in the high-speed range.

On the other hand, the noise made by the vehicle 10 while running at a speed in the high-speed range is larger than the noise made by the vehicle 10 while running at a speed in the low-speed range. For this reason, when the damping control of the electrically powered suspension system 11 is performed, both effects of enhancing the ride quality of the vehicle 10 and the suppressing the vibration near the system resonance point are required to be achieved at the same time at a higher level for the quietness in the case where the vehicle speed is in the high-speed range than the case where the vehicle speed is in the low-speed range.

Figure 7B:
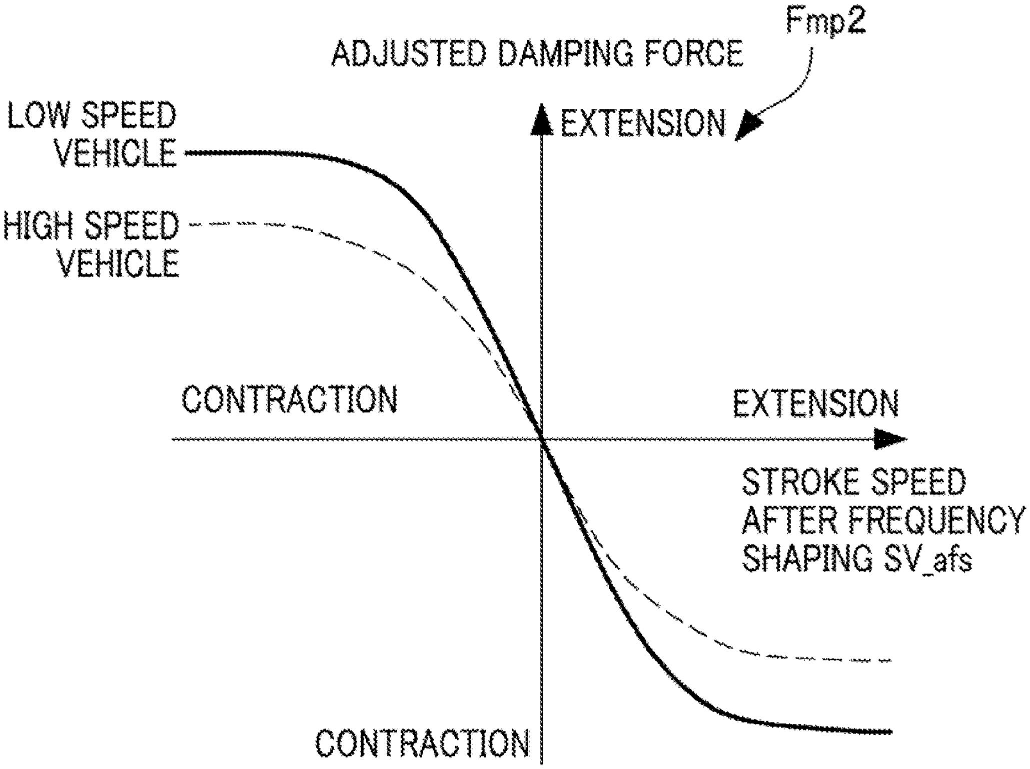
FIG. 7B is an explanatory diagram illustrating an adjusted damping force map according to a first modification of the second embodiment.

Accordingly, in the electrically powered suspension system 11 according to the eighth aspect, the adjusted damping force calculator 57 adjusts the characteristic of the adjusted damping force map Fmp2 such that the adjusted damping force for the case where the vehicle speed is in the low-speed range is larger than that in the case where the vehicle speed is in the high-speed range as illustrated in FIG. 7B, because the noise made by the vehicle 10 while running at a speed in a low-speed range is small, and therefore, the highly improved quietness is required when the damping control of the electrically powered suspension system 11 is performed.

This makes the amount of damping control of the electrically powered suspension system 11 larger in the case where the vehicle speed is in the low-speed range than in the case where the vehicle speed is in the high-speed range.

This results in sufficient suppressing of the noise deriving from the resonance vibration and thus and the improved quietness inside the vehicle compartment in the case in which the vehicle speed is in the low-speed range, than in the case where the vehicle speed is in the high-speed range.

On the other hand, in the electrically powered suspension system 11 according to the eighth aspect, the adjusted damping force calculator 57 adjusts the characteristic of the adjusted damping force map Fmp2 such that the adjusted damping force for the case where the vehicle speed is in the high-speed range is smaller than that for the case where the vehicle speed is in the low-speed range as illustrated in FIG. 7B, because both effects of enhancing the ride quality of the vehicle 10 and of suppressing the vibration near the system resonance point are required to be achieved at the same time at a higher level over the quietness.

This makes the amount of damping control of the electrically powered suspension system 11 smaller in the case where the vehicle speed is in the high-speed range than in the case where the vehicle speed is in the lower vehicle speed range.

This results in the higher level achievement of both effects of enhancing the ride quality of the vehicle 10 and of suppressing the vibration near the system resonance point in the case where the vehicle speed is in the high-speed range than in the case where the vehicle speed is in the low-speed range.

In the electrically powered suspension system 11 according to the eighth aspect, the adjusted damping force calculator 57 appropriately adjusts the characteristic of the adjusted damping force map Fmp2 based on the vehicle speed acquired by the information acquisition part 43, and thus adjusts increase and decrease in the amount of damping control of the electrically powered suspension system 11 I response to the vehicle speed. Accordingly, the electrically powered suspension system 11 according to the eighth aspect can be expected to provide the effect of enhancing the quietness inside the vehicle compartment, or both effects of enhancing the ride quality of the vehicle 10 and of suppressing the vibration near the system resonance point at the same time at a higher level, in addition to the effects provided by the electrically powered suspension system 11 according to the fifth aspect.

Meanwhile, the electrically powered suspension system 11 according to a ninth aspect is the electrically powered suspension system 11 according to the fifth aspect, and may employ a configuration in which: the information acquisition part 43 further acquires the information on the condition of the driving force generator high-pass filtering generates the driving force of the vehicle 10; and the adjusted damping force calculator 57 adjusts the characteristic of the adjusted damping force map (adjusted damping force function) Fmp2 based on the condition of the driving force generator acquired by the information acquisition part 43.

The electrically powered suspension system 11 according to the ninth aspect is the electrically powered suspension system 11 including the damping force calculator 45A2 (see FIG. 7A) according to the modification of the first embodiment.

In the electrically powered suspension system 11 according to the ninth aspect, the adjusted damping force calculator 57 appropriately adjusts the characteristic of the adjusted damping force map Fmp2 based on the condition of the driving force generator acquired by the information acquisition part 43.

Specifically, for example, in a case where the vehicle 10 is a hybrid (HV) vehicle, noise made by the vehicle 10 while running is smaller in a case in which the condition of the driving force generator is in an EV-driving mode (mainly at a low speed) of generating the driving force using an electric motor (without engine-driven) than in a case in which the condition of the drive-force generator is in an HV-driving mode (mainly at a high speed) of generating the driving force using an internal combustion engine (engine-driven). For this reason, when the damping control of the electrically powered suspension system 11 is performed, improved quietness is required in the case where the driving force generator is in the EV-driving ode than in the case where the condition of the drive-force generator is in the HV-driving mode.

On the other hand, the noise made by the vehicle 10 while running is larger in the case where the driving force generator is in the HV-driving mode than in the case where the driving force generator is in the EV-driving mode. For this reason, when the damping control of the electrically powered suspension system 11 is performed, both effects of enhancing the ride quality of the vehicle 10 and of suppressing the vibration near the system resonance point are required to be achieved at the same time at a higher level over the quietness in the case where the driving force generator is in the HV-driving mode than in the case where the driving force generator is in the EV-driving mode.

Figure 7C:
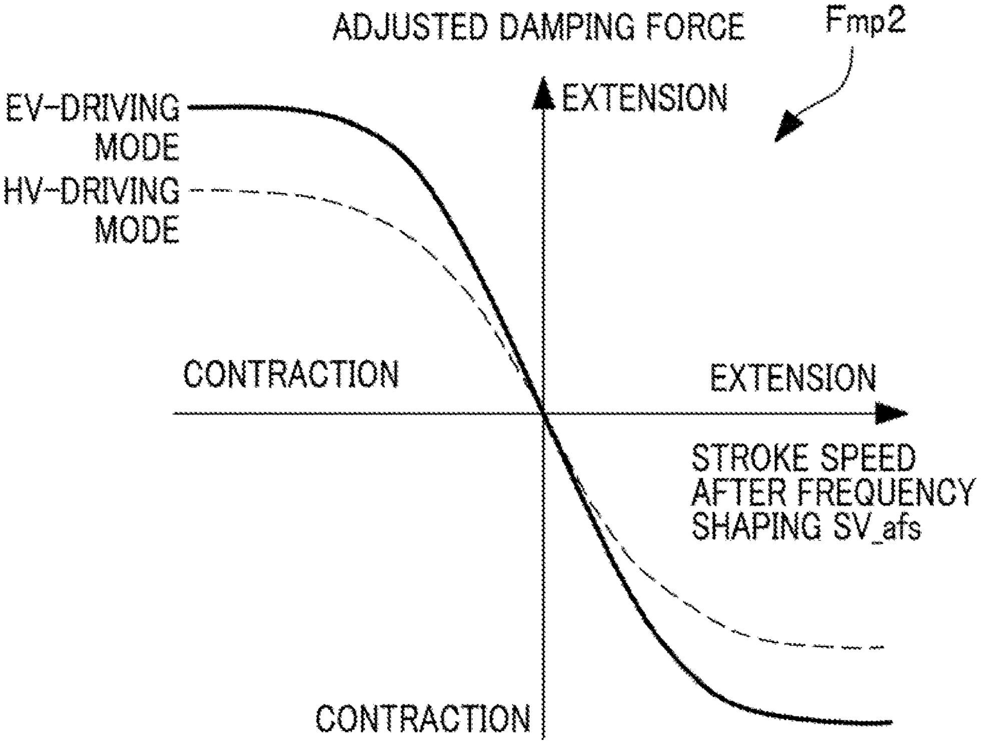
FIG. 7C is an explanatory diagram illustrating an adjusted damping force map according to a second modification of the second embodiment.

Accordingly, in the electrically powered suspension system 11 according to the ninth aspect, the adjusted damping force calculator 57 adjusts the characteristic of the adjusted damping force map Fmp2 such that the adjusted damping force in the case where the driving force generator is in the EV-driving mode is larger than that in the case where the driving force generator is in the HV-driving mode, as illustrated in FIG. 7C, because the noise made by the vehicle 10 while running is small, the improved quietness is required when the damping control of the electrically powered suspension system 11 is performed.

This makes the amount of damping control of the electrically powered suspension system 11 larger in the case where the driving force generator is in the EV-driving mode than in the case where the driving force generator is in the HV-driving mode.

This results in sufficient suppressing of the noise deriving from the resonance vibration in the case where the driving force generator is in the EV-driving mode, and the quietness inside the vehicle compartment can be accordingly improved, comparing the case where the driving force generator is in the HV-driving mode.

On the other hand, in the electrically powered suspension system 11 according to the ninth aspect, the adjusted damping force calculator 57 adjusts the characteristic of the adjusted damping force map Fmp2 such that the adjusted damping force in the case where the driving force generator is in the HV-driving mode is smaller than that in the case where the driving force generator is in the EV-driving mode, as illustrated in FIG. 7C, because both effects of enhancing the ride quality of the vehicle 10 and of suppressing the vibration near the system resonance point are required to be achieved at the same time at a higher level over the quietness.

This makes the amount of damping control of the electrically powered suspension system 11 smaller in the case where the driving force generator is in the HV-driving mode than in the case where the driving force generator is in the EV-driving mode.

This results in a simultaneous higher level achievement of both effects of enhancing the ride quality of the vehicle 10 and of suppressing the vibration near the system resonance point in the case where the driving force generator is in the HV-driving mode than in the case where the driving force generator is in the EV-driving mode.

In the electrically powered suspension system 11 according to the ninth aspect, the adjusted damping force calculator 57 appropriately adjusts the characteristic of the adjusted damping force map Fmp2 based on the condition of the driving force generator acquired by the information acquisition part 43. Thus, the electrically powered suspension system 11 according to the ninth aspect adjusts the increase and decrease in the amount of damping control of the electrically powered suspension system 11 in response to the condition of the driving force generator, in addition to the effects of the electrically powered suspension system 11 according to the fifth aspect. Accordingly, the electrically powered suspension system 11 according to the ninth aspect can be expected to provide the effect of enhancing the quietness inside the vehicle compartment, or both effects of enhancing the ride quality of the vehicle 10 and of suppressing the vibration near the system resonance point at the same time at a higher level.

Furthermore, the electrically powered suspension system 11 according to a tenth aspect is the electrically powered suspension system 11 according to the seventh aspect, and may employ a configuration in which: the information acquisition part 43 further acquires the information on the vehicle speed; and the adjusted damping force calculator 57 adjusts the characteristic of the adjusted damping force map (adjusted damping force function) Fmp2 based on the vehicle speed acquired by the information acquisition part 43.

The electrically powered suspension system 11 according to the tenth aspect corresponds to the electrically powered suspension system 11 including the damping force calculator 45B2 (see FIG. 8A) according to the modification of the second embodiment.

In the electrically powered suspension system 11 according to the tenth aspect, the adjusted damping force calculator 57 appropriately adjusts the characteristic of the adjusted damping force map Fmp2 based on the vehicle speed acquired by the information acquisition part 43 (see FIG. 7B), similarly to the electrically powered suspension system 11 according to the eighth aspect. Thus, the electrically powered suspension system 11 according to the tenth aspect adjusts the increase and decrease in the amount of damping control of the electrically powered suspension system 11 in response to the vehicle speed, in addition to the effects of the electrically powered suspension system 11 according to the seventh aspect. Accordingly, the electrically powered suspension system 11 according to the tenth aspect can be expected to provide the effect of enhancing the quietness inside the vehicle compartment, or both the effects of enhancing the ride quality of the vehicle 10 and of suppressing the vibration near the system resonance point at the same time at a higher level.

Meanwhile, the electrically powered suspension system 11 according to an eleventh aspect is the electrically powered suspension system 11 according to the seventh aspect, and may employ a configuration in which: the information acquisition part 43 further acquires the information on the condition of the driving force generator that generates the driving force of the vehicle 10; and the adjusted damping force calculator 57 adjusts the characteristic of the adjusted damping force map (adjusted damping force function) Fmp2 based on the condition of the driving force generator acquired by the information acquisition part 43.

The electrically powered suspension system 11 according to the eleventh aspect is the electrically powered suspension system 11 including the damping force calculator 45B2 (see FIG. 8A) according to the modification of the second embodiment.

In the electrically powered suspension system 11 according to the eleventh aspect, the adjusted damping force calculator 57 appropriately adjusts the characteristic of the adjusted damping force map Fmp2 based on the condition of the driving force generator acquired by the information acquisition part 43 (see FIG. 7C), like in the electrically powered suspension system 11 according to the ninth aspect. Thus, the electrically powered suspension system 11 according to the eleventh aspect adjusts the increase and decrease in the amount of damping control of the electrically powered suspension system 11 in response to the condition of the driving force generator, in addition to the effects of the electrically powered suspension system 11 according to the seventh aspect. Accordingly, the electrically powered suspension system 11 according to the eleventh aspect can be expected to provide the effect of enhancing the quietness inside the vehicle compartment, or the effect of achieving both the effects of enhancing the ride quality of the vehicle 10 and of suppressing the vibration near the system resonance point at the same time at a higher level.

Furthermore, the electrically powered suspension system 11 according to a twelfth aspect is the electrically powered suspension system 11 according to the fourth aspect, and may employ a configuration in which: the information acquisition part 43 further acquires the information on the vehicle speed; and the adjusted damping force calculator 57 adjusts the cutoff frequency fc of the low-pass filter 53 based on the vehicle speed acquired by the information acquisition part 43.

The electrically powered suspension system 11 according to the twelfth aspect corresponds to the electrically powered suspension system 11 including the damping force calculator 45A2 (see FIG. 7A) according to the modification of the first embodiment.

In the electrically powered suspension system 11 according to the twelfth aspect, the adjusted damping force calculator 57 appropriately adjusts the cutoff frequency fc of the low-pass filter 53 based on the vehicle speed acquired by the information acquisition part 43.

Specifically, for example, when the damping control of the electrically powered suspension system 11 is performed, improved quietness is required in the case where the vehicle speed is in the low-speed range than in the case where the vehicle speed is in the high-speed range.

On the other hand, as discussed above, when the damping control of the electrically powered suspension system 11 is performed, both effects of enhancing the ride quality of the vehicle 10 and of suppressing the vibration near the system resonance point are required to be achieved at the same time at a higher level over the quietness in the case where the vehicle speed is in the high-speed range than in the case where the vehicle speed is in the low-speed range.

Figure 7D:
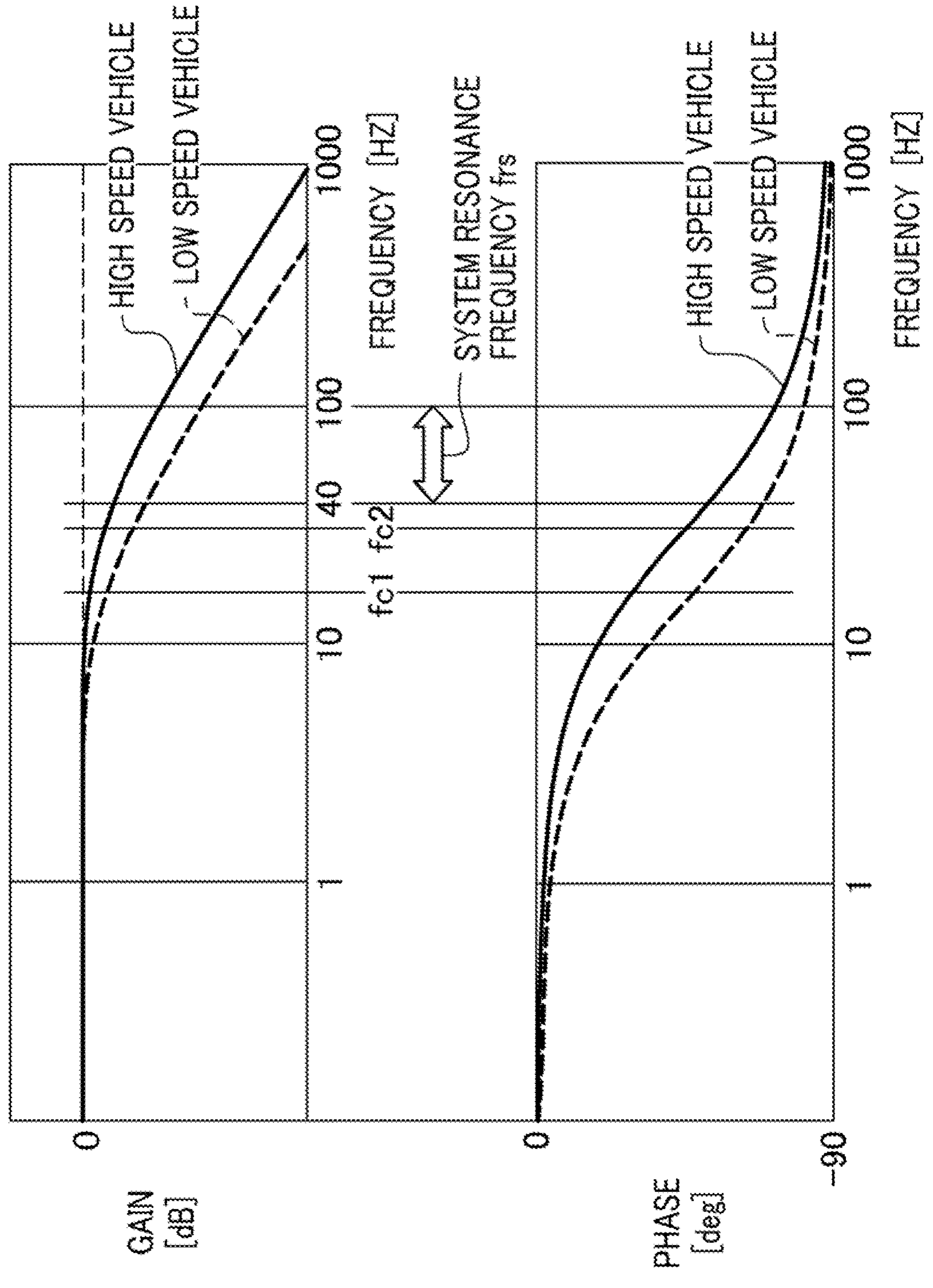
FIG. 7D is an explanatory diagram illustrating a frequency characteristics of a gain and a phase of a low-pass filter included in a damping force calculator according to the first modification of the first embodiment.

Accordingly, in the electrically powered suspension system 11 according to the twelfth aspect, as illustrated in FIG. 7D, the adjusted damping force calculator 57 performs the adjustment such that a cutoff frequency fc1 (fc1=15 Hz in a case illustrated in FIG. 7D) in the case where the vehicle speed is in the low-speed range is lower than a cutoff frequency fc2 (fc2=30 Hz in the case illustrated in FIG. 7D) in the case where the vehicle speed is in the high-speed range, because the noise made by the vehicle 10 is small while running in the low-speed range, and thus the improved quietness is required when the damping control of the electrically powered suspension system 11 is performed.

This widens the frequency band controlled as the vibration damping target, which results in the larger amount of damping control by the electrically powered suspension system 11 in the case where the vehicle speed is in the low-speed range than in the case where the vehicle speed is in the high-speed range.

As a result, the noise deriving from the resonance vibration is more sufficiently suppressed in the case where the vehicle speed is in the low-speed range than in the case where the vehicle speed is in the high-speed range, which can improve the quietness inside the vehicle compartment.

On the other hand, in the electrically powered suspension system 11 according to the twelfth aspect, the adjusted damping force calculator 57 performs the adjustment such that the cutoff frequency fc2 in the case where the vehicle speed is in the high-speed range is higher than the cutoff frequency Fc1 in the case where the vehicle speed is in the lower vehicle speed range, as illustrated in FIG. 7D, because both effects of enhancing the ride quality of the vehicle 10 and of suppressing the vibration near the system resonance point are required to be achieved at the same time at a higher level over the quietness.

This reduces the amount of damping control of the electrically powered suspension system 11 in the case where the vehicle speed is in the high-speed range comparing the case where the vehicle speed is in the lower vehicle speed range.

This results in achievement of both effects of enhancing the ride quality of the vehicle 10 and of suppressing the vibration near the system resonance point, at the same time at a higher level in the case where the vehicle speed is in the high-speed range than in the case where the vehicle speed is in the low-speed range.

In the electrically powered suspension system 11 according to the twelfth aspect, the adjusted damping force calculator 57 appropriately adjusts the cutoff frequency fc based on the vehicle speed acquired by the information acquisition part 43 (see FIG. 7D), which allows to adjust the increase and decrease in the amount of damping control of the electrically powered suspension system 11 in response to the vehicle speed. Accordingly, the effect of enhancing the quietness inside the vehicle compartment, or the effect of achieving both effects of enhancing the ride quality of the vehicle 10 and of suppressing the vibration near the system resonance point at the same time at a higher level can be expected to be provided by the electrically powered suspension system 11 according to the twelfth aspect, in addition to the effects of the electrically powered suspension system 11 according to the fourth aspect.

Meanwhile, the electrically powered suspension system 11 according to a thirteenth aspect is the electrically powered suspension system 11 according to the fourth aspect, and may employ a configuration in which: the information acquisition part 43 further acquires the information on the condition of the driving force generator generating the driving force of the vehicle 10; and the adjusted damping force calculator 57 adjusts the cutoff frequency fc based on the condition of the driving force generator acquired by the information acquisition part 43.

The electrically powered suspension system 11 according to the thirteenth aspect corresponds to the electrically powered suspension system 11 including the damping force calculator 45A2 (see FIG. 7A) according to the modification of the first embodiment.

In the electrically powered suspension system 11 according to the thirteenth aspect, the adjusted damping force calculator 57 appropriately adjusts the cutoff frequency fc based on the condition of the driving force generator acquired by the information acquisition part 43.

Specifically, as discussed above, when the damping control of the electrically powered suspension system 11 is performed, improved quietness is required in the case where the driving force generator is in the EV-driving mode than in the case where the driving force generator is in the HV-driving mode.

On the other hand, when the damping control of the electrically powered suspension system 11 is performed, both the effects of enhancing the ride quality of the vehicle 10 and of suppressing the vibration near the system resonance point are required to be achieved at the same time at a higher level over the quietness in the case where the condition of the driving force generator is the HV-driving mode than in the case where the condition of the driving force generator is the EV-driving mode.

Figure 7E:
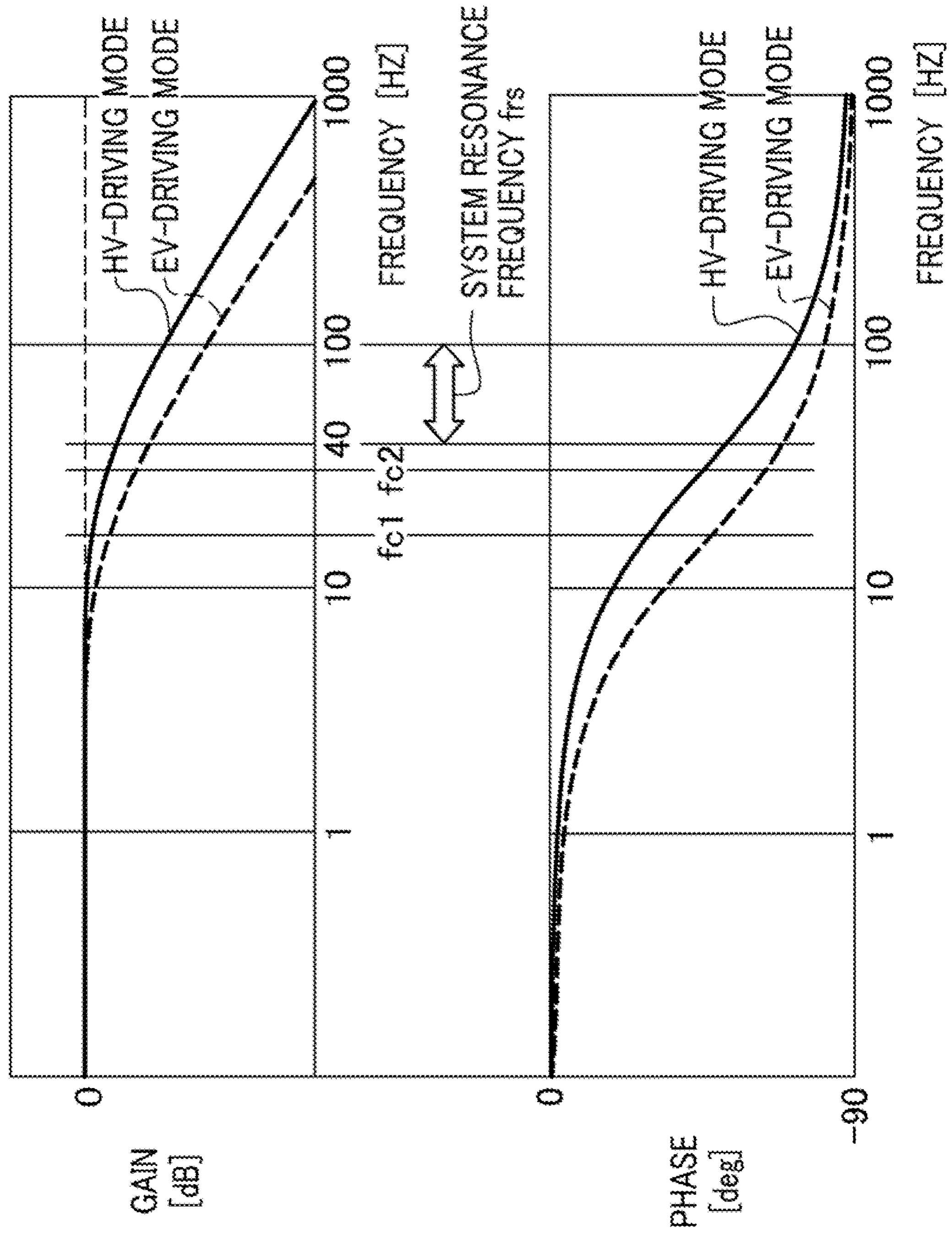
FIG. 7E is an explanatory diagram illustrating a frequency characteristics of a gain and a phase of a low-pass filter included in a damping force calculator according to the second modification of the first embodiment.

Accordingly, in the electrically powered suspension system 11 according to the thirteenth aspect, the adjusted damping force calculator 57 performs the adjustment such that the cutoff frequency fc1 (fc1=15 Hz in a case illustrated in FIG. 7E) in the case where the driving force generator is in the EV-driving mode is lower than the cutoff frequency fc2 (fc2=30 Hz in the case illustrated in FIG. 7E) in the case where the driving force generator is in the HV-driving mode, as illustrated in FIG. 7E, because the noise made by the vehicle 10 while running is small, which requires the improved quietness when the damping control of the electrically powered suspension system 11 is performed.

This widens the frequency band controlled as the vibration damping target, which results in larger amount of damping control of the electrically powered suspension system 11 in the case where the driving force generator is in the EV-driving mode than in the case where the driving force generator is in the HV-driving mode.

Thus, the noise deriving from the resonance vibration is more sufficiently suppressed, and the quietness inside the vehicle compartment can be more improved in the case where the driving force generator is in the EV-driving mode than in the case where the driving force generator is in the HV-driving mode.

On the other hand, in the electrically powered suspension system 11 according to the thirteenth aspect, the adjusted damping force calculator 57 performs the adjustment such that the cutoff frequency fc2 is higher in the case where the driving force generator is in the HV-driving mode than the cutoff frequency fc1 in the case where the driving force generator is in the EV-driving mode, as illustrated in FIG. 7E, because both effects of enhancing the ride quality of the vehicle 10 and of suppressing the vibration near the system resonance point are required to be achieved at the same time at a higher level over the quietness.

This makes the frequency band controlled as the vibration damping target narrower, which results in smaller amount of damping control by the electrically powered suspension system 11 in the case where the driving force generator is in the HV-driving mode than in the case where the driving force generator is in the EV-driving mode.

Therefore, in the case where the driving force generator is in the HV-driving mode, both of the effects of enhancing the ride quality of the vehicle 10 and of suppressing the vibration near the system resonance point can be achieved at the same time at a higher level than in the case where the driving force generator is in the EV-driving mode.

In the electrically powered suspension system 11 according to the thirteenth aspect, the adjusted damping force calculator 57 appropriately adjusts the cutoff frequency fc based on the condition of the driving force generator acquired by the information acquisition part 43 (see FIG. 7E). Therefore, the electrically powered suspension system 11 according to the thirteenth aspect adjusts the increase and decrease in the amount of damping control of the electrically powered suspension system 11 in response to the condition of the driving force generator, in addition to the effects of the electrically powered suspension system 11 according to the fourth aspect. Accordingly, the effect of enhancing the quietness inside the vehicle compartment, or the effect of achieving both the effects of enhancing the ride quality of the vehicle 10 and of suppressing the vibration near the system resonance point at the same time at a higher level can be expected to be provided by the electrically powered suspension system 11 according to the thirteenth aspect.

Furthermore, the electrically powered suspension system 11 according to a fourteenth aspect is the electrically powered suspension system 11 according to the sixth aspect, and may further employ a configuration in which: the information acquisition part 43 further acquires the information on the vehicle speed; and the adjusted damping force calculator 57 adjusts the cutoff frequency fc of the high-pass filter 56 according to the vehicle speed acquired by the information acquisition part 43.

The electrically powered suspension system 11 according to the fourteenth aspect corresponds to the electrically powered suspension system 11 including the damping force calculator 45B2 (see FIG. 8A) according to the modification of the second embodiment.

In the electrically powered suspension system 11 according to the fourteenth aspect, the adjusted damping force calculator 57 appropriately adjusts the cutoff frequency fc based on the vehicle speed acquired by the information acquisition part 43 (see FIG. 8A), like the electrically powered suspension system 11 according to the twelfth aspect. The electrically powered suspension system 11 according to the fourteenth aspect adjusts the increase and decrease in the amount of damping control of the electrically powered suspension system 11 in response to the vehicle speed, in addition to the effects of the electrically powered suspension system 11 according to the sixth aspect. Accordingly, the effect of enhancing the quietness inside the vehicle compartment, or the effect of achieving both the effects of enhancing the ride quality of the vehicle 10 and of suppressing the vibration near the system resonance point at the same time at a higher level can be expected to be provided by the electrically powered suspension system 11 according to the fourteenth aspect.

Furthermore, the electrically powered suspension system 11 according to a fifteenth aspect is the electrically powered suspension system 11 according to the sixth aspect, and may further employ a configuration in which: the information acquisition part 43 further acquires the information on the condition of the driving force generator high-pass filtering generates the driving force of the vehicle 10; and the adjusted damping force calculator 57 adjusts the cutoff frequency fc based on the condition of the driving force generator acquired by the information acquisition part 43.

The electrically powered suspension system 11 according to the fifteenth aspect corresponds to the electrically powered suspension system 11 including the damping force calculator 45B2 (see FIG. 8A) according to the modification of the second embodiment.

Figure 8C:
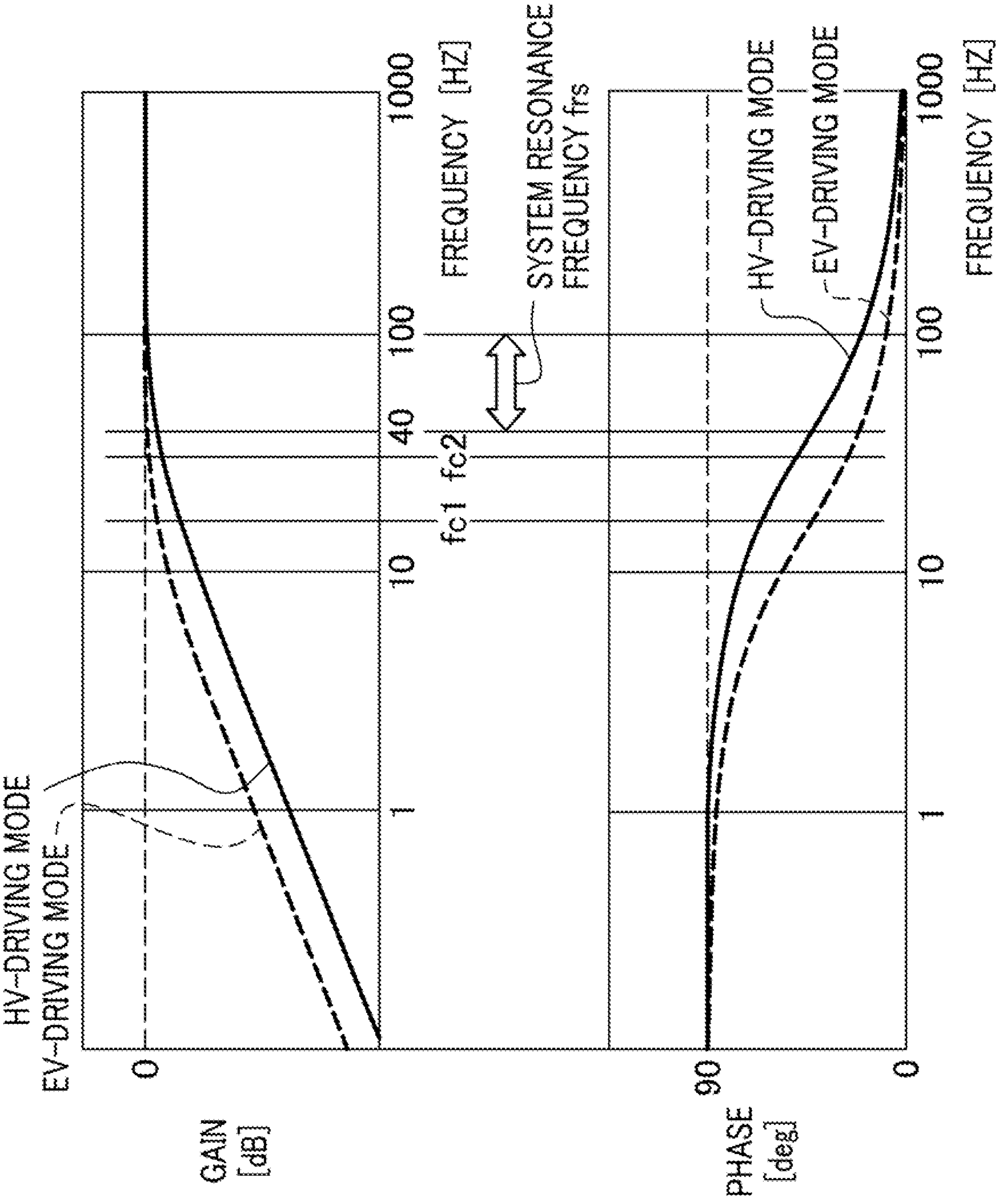
FIG. 8C is an explanatory diagram illustrating a frequency characteristics of a gain and a phase of a high-pass filter included in the damping force calculator according to the second modification of the second embodiment.

In the electrically powered suspension system 11 according to the fifteenth aspect of the present invention, the adjusted damping force calculator 57 appropriately adjusts the cutoff frequency fc based on the condition of the driving force generator acquired by the information acquisition part 43 (see FIG. 8C), similarly to the electrically powered suspension system 11 according to the thirteenth aspect. The electrically powered suspension system 11 according to the fifteenth aspect adjusts the increase and decrease in the amount of damping control of the electrically powered suspension system 11 in response to the condition of the driving force generator, in addition to the effects of the electrically powered suspension system 11 according to the sixth aspect. Accordingly, the effect of enhancing the quietness inside the vehicle compartment, or both the effects of enhancing the ride quality of the vehicle 10 and of suppressing the vibration near the system resonance point at the same time at a higher level can be expected to be provided by the electrically powered suspension system 11 according to the fifteenth aspect.

Furthermore, the electrically powered suspension system 11 according to a sixteenth aspect is the electrically powered suspension system 11 according to the fifth or seventh aspect, and may further employ a configuration in which the adjusted damping force calculator 57 calculates the adjusted damping force for suppressing the system resonance of the electrically powered suspension system 11 according to the adjusted damping force map (adjusted damping force function) Fmp2, and thereafter limits to a predetermined limit threshold the part of values of the calculated adjusted damping force that exceed the predetermined limit threshold.

The electrically powered suspension system 11 according to the sixteenth aspect corresponds to the electrically powered suspension system 11 including either the damping force calculator 45A1 (see FIG. 4A) according to the first embodiment or the damping force calculator 45B1 (see FIG. 4D) according to the second embodiment.

In the electrically powered suspension system 11 according to the sixteenth aspect of the present invention, the adjusted damping force calculator 57 limits a part exceeding the predetermined limit threshold (see FIG. 5C) among the values of the calculated adjusted damping force to the predetermined limit threshold, and therefore prevent the value of the calculated adjusted damping force from becoming large endlessly. Accordingly, the value of the target damping force adjusted using the adjusted damping force also does not become excessively large. Thus, the electrically powered suspension system 11 according to the sixteenth aspect can preclude the ride quality of the vehicle 10 from deteriorating due to mutual interference that would otherwise occur between the value of the adjusted damping force and the value of the referential damping force.

Other Embodiments

The embodiment and the plurality of modifications described above show examples for implementations of the present invention. Therefore, the technical scope of the present invention should not be construed to be limited to these embodiment and modifications. The present invention can be implemented in various embodiments without departing from the gist or the main scope of the present invention.

For example, the electrically powered suspension system 11 according to the modifications of the first or second examples have been described using the examples where the calculation of the adjusted damping force according to the information on the stroke velocity SV_afs after the frequency-shaping and the information stored in the adjusted damping force map Fmp is achieved by: receiving the information on the vehicle speed and the information on the condition of the driving force generator acquired by the information acquisition part 43; and adjusting the characteristic of the adjusted damping force map Fmp based on at least one of the two received kinds of information.

In this respect, the adjustment of the characteristic of the adjusted damping force map Fmp includes, for example, changing the inclination of the linear adjusted damping force characteristic diagram in the adjusted damping force map Fmp1 according to the first example. Furthermore, the concept of the adjustment of the characteristic of the adjusted damping force map Fmp also includes, for example, changing the reference destination of the adjusted damping force map Fmp from the adjusted damping force map Fmp1 according to the first example to the adjusted damping force map Fmp2 according to the second example.

Further, the electrically powered suspension system 11 according to the embodiment is described in the embodiment that arranges the total of four electromagnetic actuators 13 on both the front wheels (front right wheel and front left wheel) and the rear wheels (rear right wheel and rear left wheel). However, the present invention is not limited to this specific embodiment. For example, the total of two electromagnetic actuators 13 may be arranged in either one of the front wheels and the rear wheels.

Finally, the electrically powered suspension system 11 according to each embodiment is described such that the drive controller 49 performs independent drive control of each of the plurality of electromagnetic actuators 13. To be more specific, the drive controller 49 may perform independent drive control of each of the electromagnetic actuators 13 respectively provided to the four wheels for each of the wheels. Further, the drive controller 49 may performs independent drive control of the electromagnetic actuators 13 respectively provided to the four wheels, separately for the front wheels and the rear wheels, or separately for the right wheels and the left wheels.

What is claimed is:

1. An electrically powered suspension system comprising:

an electromagnetic actuator provided between a vehicle body and a wheel, and generating a driving force for vibration damping of a vehicle;

an information acquisition part acquiring information on a stroke velocity of the electromagnetic actuator;

a damping force calculator that calculates a target damping force as a target value of a damping operation of the electromagnetic actuator, based on the information on the stroke velocity acquired by the information acquisition part; and a drive controller controlling drive of the electromagnetic actuator using a target driving force based on the target damping force calculated by the damping force calculator, wherein the damping force calculator includes:

a low-pass filter extracting a low-frequency component from the information on the stroke velocity;

a subtractor subtracting the low-frequency component extracted from the stroke velocity; and an adjusted damping force calculator calculating an adjusted damping force based on the information on the stroke velocity after frequency-shaping by the subtractor's subtracting, the damping force calculator adjusts the target damping force using the adjusted damping force calculated, and a cutoff frequency of the low-pass filter is set at a frequency lower than a resonance frequency of a system resonance point of the electrically powered suspension system.

2. The electrically powered suspension system according to claim 1, wherein the adjusted damping force calculator calculates the adjusted damping force based on an adjusted damping force function that uses the stroke velocity after the frequency-shaping as an argument.

3. The electrically powered suspension system according to claim 2, wherein the information acquisition part further acquires information on a vehicle speed, and the adjusted damping force calculator adjusts a characteristic of the adjusted damping force function based on the information on the vehicle speed acquired by the information acquisition part.

4. The electrically powered suspension system according to claim 2, wherein the information acquisition part further acquires information on a condition of a driving force generator generating a driving force of the vehicle, and the adjusted damping force calculator adjusts a characteristic of the adjusted damping force function based on the information on the condition of the driving force generator acquired by the information acquisition part.

5. The electrically powered suspension system according to claim 1, wherein the information acquisition part further acquires information on a vehicle speed, and the adjusted damping force calculator adjusts the cutoff frequency based on the information on the vehicle speed acquired by the information acquisition part.

6. The electrically powered suspension system according to claim 1, wherein the information acquisition part further acquires information on a condition of a driving force generator that generates a driving force of the vehicle, and the adjusted damping force calculator adjusts the cutoff frequency based on the information on the condition of the driving force generator acquired by the information acquisition part.

7. The electrically powered suspension system according to claim 2, wherein the adjusted damping force calculator calculates the adjusted damping force based on the adjusted damping force function, and then limits a portion of a value of the adjusted damping force calculated that exceeds a predetermined limit threshold, to the predetermined limit threshold.

8. An electrically powered suspension system comprising:

an electromagnetic actuator provided between a vehicle body and a wheel and generating a driving force for vibration damping of a vehicle;

an information acquisition part that acquires information on a stroke velocity of the electromagnetic actuator;

a damping force calculator that calculates a target damping force as a target value of a damping operation of the electromagnetic actuator, based on the information on the stroke velocity acquired by the information acquisition part; and a drive controller that controls drive of the electromagnetic actuator using a target driving force based on the target damping force calculated by the damping force calculator, wherein the damping force calculator includes:

a high-pass filter that performs a process of extracting a high-frequency component from the information on the stroke velocity; and an adjusted damping force calculator that calculates an adjusted damping force based on the information on the stroke velocity after frequency-shaping by the process, the damping force calculator adjusts the target damping force using the adjusted damping force calculated, and a cutoff frequency of the high-pass filter is set at a frequency lower than a resonance frequency of a system resonance point of the electrically powered suspension system.

9. The electrically powered suspension system according to claim 8, wherein the adjusted damping force calculator calculates the adjusted damping force based on an adjusted damping force function that uses the information on the stroke velocity after the frequency-shaping as an argument.

10. The electrically powered suspension system according to claim 9, wherein the information acquisition part further acquires information on a vehicle speed, and the adjusted damping force calculator adjusts a characteristic of the adjusted damping force function based on the information on the vehicle speed acquired by the information acquisition part.

11. The electrically powered suspension system according to claim 9, wherein the information acquisition part further acquires information on a condition of a driving force generator that generates a driving force of the vehicle, and the adjusted damping force calculator adjusts a characteristic of the adjusted damping force function based on the information on the condition of the driving force generator acquired by the information acquisition part.

12. The electrically powered suspension system according to claim 8, wherein the information acquisition part further acquires information on a vehicle speed, and the adjusted damping force calculator adjusts the cutoff frequency based on the information on the vehicle speed acquired by the information acquisition part.

13. The electrically powered suspension system according to claim 8, wherein the information acquisition part further acquires information on a condition of a driving force generator that generates a driving force of the vehicle, and the adjusted damping force calculator adjusts the cutoff frequency based on the information on the condition of the driving force generator acquired by the information acquisition part.

14. The electrically powered suspension system according to claim 9, wherein the adjusted damping force calculator calculates the adjusted damping force based on the adjusted-damping force function, and then limits a portion of a value of the adjusted damping force calculated that exceeds a predetermined limit threshold, to the predetermined limit threshold.

* * * * *